(12) United States Patent
Landis et al.

(10) Patent No.: US 7,725,559 B2
(45) Date of Patent: May 25, 2010

(54) VIRTUAL DATA CENTER THAT ALLOCATES AND MANAGES SYSTEM RESOURCES ACROSS MULTIPLE NODES

(75) Inventors: John A. Landis, Pipersville, PA (US); Terrence V. Powderly, East Fallowfield, PA (US); Rajagopalan Subrahmanian, Phoenixville, PA (US); Aravindh Puthiyaparambil, Phoenixville, PA (US)

(73) Assignee: Unisys Corporation, Blue Bell, PA (US)

( * ) Notice: Subject to any disclaimer, the term of this patent is extended or adjusted under 35 U.S.C. 154(b) by 985 days.

(21) Appl. No.: 10/575,140

(22) PCT Filed: Oct. 7, 2004

(86) PCT No.: PCT/US2004/033450

§ 371 (c)(1),
(2), (4) Date: Apr. 7, 2006

(87) PCT Pub. No.: WO2005/036367

PCT Pub. Date: Apr. 21, 2005

(65) Prior Publication Data

US 2007/0067435 A1 Mar. 22, 2007

(51) Int. Cl.
*G06F 15/167* (2006.01)
*G06F 15/16* (2006.01)
*G06F 15/173* (2006.01)

(52) U.S. Cl. .................. 709/215; 709/223; 709/226; 709/229

(58) Field of Classification Search .......... 709/200, 709/215, 226, 223, 229
See application file for complete search history.

(56) References Cited

U.S. PATENT DOCUMENTS

| | | | |
|---|---|---|---|
| 5,555,385 A | 9/1996 | Osisek | |
| 6,199,179 B1 | 3/2001 | Kauffman et al. | |
| 6,223,202 B1* | 4/2001 | Bayeh | 718/102 |
| 6,438,671 B1 | 8/2002 | Doing et al. | |
| 6,725,289 B1 | 4/2004 | Waldspurger et al. | |
| 7,020,738 B2* | 3/2006 | Neiger et al. | 711/6 |
| 7,035,963 B2* | 4/2006 | Neiger et al. | 711/6 |
| 7,191,440 B2* | 3/2007 | Cota-Robles et al. | 718/1 |
| 7,200,530 B2* | 4/2007 | Brown et al. | 703/1 |
| 7,203,944 B1* | 4/2007 | van Rietschote et al. | 718/104 |
| 7,213,246 B1* | 5/2007 | van Rietschote et al. | 718/1 |
| 7,424,709 B2* | 9/2008 | Neiger et al. | 718/1 |
| 2002/0087611 A1 | 7/2002 | Tanaka et al. | |
| 2002/0129127 A1 | 9/2002 | Romero et al. | |

* cited by examiner

*Primary Examiner*—William C Vaughn, Jr.
*Assistant Examiner*—Kristie D Shingles
(74) *Attorney, Agent, or Firm*—Richard J. Gregson; Woodcock Washburn LLP

(57) ABSTRACT

A virtualization infrastructure that allows multiple guest partitions to run within a host hardware partition. The host system is divided into distinct logical or virtual partitions and special infrastructure partitions are implemented to control resource management and to control physical I/O device drivers that are, in turn, used by operating systems in other distinct logical or virtual guest partitions. Host hardware resource management runs as a tracking application in a resource management "ultravisor" partition, while host resource management decisions are performed in a higher level command partition based on policies maintained in a separate operations partition. Host hardware I/O management is implemented in special redundant I/O partitions. Operating systems in other logical or virtual partitions communicate with the I/O partitions via memory channels established by the ultravisor partion.

23 Claims, 15 Drawing Sheets

Partitioned Host System

Partition Monitors

Partition Channels

Processor Sharing

Processor Schedule

| $(2^{10})^n$ | SI Prefix | SI Name | Page Table | Pageantry | IA32/EM32T |
|---|---|---|---|---|---|
| 1 | K | kilo | PKM | PKE | PT/PTE |
| 2 | M | mega | PMM | PME | PD/PDE |
| 3 | G | giga | PGM | PGE | PDP |
| 4 | T | tera | PTM | PTE | PML4 |
| 5 | P | peta | PPM | PPE | |
| 6 | E | Exa | PEM | PEE | |
| 7 | Z | zetta | PZM | PZE | |
| 8 | Y | yotta | PYM | PYE | |

SI Prefixes for Page Table Hierarchy

*Figure 7*

Partition Memory Map

Ultravisor Domains

Ultravisor Partition Agents

Virtual Data Center Zones

Data Center / Multiple Hosts

Data Center / Multiple Hosts

Multiple Ultravisor Resource Partitions

VIRTUAL DATA CENTER THAT ALLOCATES AND MANAGES SYSTEM RESOURCES ACROSS MULTIPLE NODES

FIELD OF THE INVENTION

The invention relates to computer system para-virtualization using a hypervisor that is implemented in a distinct logical or virtual partition of the host system so as to manage multiple operating systems running in other distinct logical or virtual partitions of the host system. The hypervisor implements a partition policy and resource services that provide for more or less automatic operation of the virtual partitions in a relatively failsafe manner.

BACKGROUND OF THE INVENTION

Computer system virtualization allows multiple operating systems and processes to share the hardware resources of a host computer. Ideally, the system virtualization provides resource isolation so that each operating system does not realize that it is sharing resources with another operating system and does not adversely affect the execution of the other operating system. Such system virtualization enables applications including server consolidation, co-located hosting facilities, distributed web services, applications mobility, secure computing platforms, and other applications that provide for efficient use of underlying hardware resources.

Virtual machine monitors (VMMs) have been used since the early 1970s to provide a software application that virtualizes the underlying hardware so that applications running on the VMMs are exposed to the same hardware functionality provided by the underlying machine without actually "touching" the underling hardware. For example, the IBM/370 mainframe computer provided multiple virtual hardware instances that emulated the operation of the underlying hardware and provided context switches amongst the virtual hardware instances. However, as IA-32, or x86, architectures became more prevalent, it became desirable to develop VMMs that would operate on such platforms. Unfortunately, unlike the IBM/370 mainframe systems, the IA-32 architecture was not designed for full virtualization as certain supervisor instructions had to be handled by the VMM for correct virtualization but could not be handled appropriately because use of these supervisor instructions did not cause a trap to be generated that could be handled using appropriate interrupt handling techniques.

In recent years, VMWare and Connectix have developed relatively sophisticated virtualization systems that address these problems with IA-32 architecture by dynamically rewriting portions of the hosted machine's code to insert traps wherever VMM intervention might be required and to use binary translation to resolve the traps. This translation is applied to the entire guest operating system kernel since all non-trapping privileged instructions have to be caught and resolved. Such an approach is described, for example, by Bugnion et al. in an article entitled "Disco: Running Commodity Operating Systems on Scalable Multiprocessors," Proceedings of the 16th Symposium on Operating Systems Principles (SOSP), Saint-Malo, France, October 1997.

The complete virtualization approach taken by VMWare and Connectix has significant processing costs. For example, the VMWare ESX Server implements shadow tables to maintain consistency with virtual page tables by trapping every update attempt, which has a high processing cost for update intensive operations such as creating a new application process. Moreover, though the VMWare systems use pooled I/O and allow reservation of PCI cards to a partition, such systems do not create I/O partitions for the purpose of hoisting shared I/O from the hypervisor for reliability and for improved performance.

The drawbacks of complete virtualization may be avoided by providing a VMM that virtualizes most, but not all, of the underlying hardware operations. This approach has been referred to by Whitaker et al. at the University of Washington as "para-virtualization." Unlike complete virtualization, the para-virtualization approach requires modifications to the guest operating systems to be hosted. However, as will be appreciated from the detailed description below, para-virtualization does not require changes to the application binary interface (ABI) so that no modifications at all are required to the guest applications. Whitaker et al. have developed such a "para-virtualization" system as a scalable isolation kernel referred to as Denali. Denali has been designed to support thousands of virtual machines running network services by assuming that a large majority of the virtual machines are small-scale, unpopular network services. Denali does not fully support x86 segmentation, even though x86 segmentation is used in the ABIs of NetBSD, Linux, and Windows XP. Moreover, each virtual machine in the Denali system hosts a single-user, single-application unprotected operating system, as opposed to hosting a real, secure operating system that may, in turn, execute thousands of unmodified user-level application processes. Also, in the Denali architecture the VMM performs all paging to and from disk for all operating systems, thereby adversely affecting performance isolation for each hosted "operating system." Finally, in the Denali architecture, the virtual machines have no knowledge of hardware addresses so that no virtual machine may access the resources of another virtual machine. As a result, Denali does not permit the virtual machines to directly access physical resources.

The complete virtualization systems of VMWare and Connectix, and the Denali architecture of Whitaker et al. also have another common, and significant, limitation. Since each system loads a VMM directly on the underlying hardware and all guest operating systems run "on top of" the VMM, the VMM becomes a single point of failure for all of the guest operating systems. Thus, when implemented to consolidate servers, for example, the failure of the VMM could cause failure of all of the guest operating systems hosted on that VMM. It is desired to provide a virtualization system in which guest operating systems may coexist on the same node without mandating a specific application binary interface to the underlying hardware, and without providing a single point of failure for the node. Moreover, it is desired to provide a virtualization system with failover protection so that failure of the virtualization elements and/or the underlying hardware does not bring down the entire node. It is further desired to provide improved system flexibility whereby the system is scalable and a system user may specify desired systems resources that the virtualization system may allocate efficiently over all available resources in a data center. The present invention addresses these limitations in the current state of the art.

SUMMARY OF THE INVENTION

The present invention addresses the above-mentioned limitations in the art by providing virtualization infrastructure that allows multiple guest partitions to run within a host hardware partition. The host system is divided into distinct logical or virtual partitions and special infrastructure partitions are implemented to control resource management and to control physical I/O device drivers that are, in turn, used by operating systems in other distinct logical or virtual guest partitions. Host hardware resource management runs as a tracking application in a resource management "ultravisor" partition while host resource management decisions are performed in a higher level "command" partition based on policies maintained in an "operations" partition. This distributed resource management approach provides for recovery of each aspect of policy management independently in the event of a system failure. Also, since the system resource management functionality is implemented in the ultravisor partition, the roles of the conventional hypervisor and containment element (monitor) for the respective partitions are reduced in complexity and scope.

In an exemplary embodiment, an ultravisor partition maintains the master in-memory database of the hardware resource allocations. This low level resource manager serves a command channel to accept transactional requests for assignment of resources to partitions. It also provides individual read-only views of individual partitions to the associated partition monitors. Similarly, host hardware I/O management is implemented in special redundant I/O partitions. Operating systems in other logical or virtual partitions communicate with the I/O partitions via memory channels established by the ultravisor partition.

In accordance with the invention, the guest operating systems in the respective logical or virtual partitions are modified to access monitors that implement a system call interface through which the ultravisor, I/O, and any other special infrastructure partitions may initiate communications with each other and with the respective guest partitions. In addition, the guest operating systems are modified so that they do not attempt to use the "broken" instructions in the x86 system that complete virtualization systems must resolve by inserting traps. This requires modification of a relatively few lines of operating system code while significantly increasing system security by removing many opportunities for hacking into the kernel via the "broken" instructions.

In a preferred embodiment, a scalable partition memory mapping system is implemented in the ultravisor partition so that the virtualized system is scalable to a virtually unlimited number of pages. A log ($2^{10}$) based allocation allows the virtual partition memory sizes to grow over multiple generations without increasing the overhead of managing the memory allocations. Each page of memory is assigned to one partition descriptor in the page hierarchy and is managed by the ultravisor partition.

In the preferred embodiment, the I/O server partitions map physical host hardware to I/O channel server endpoints, where the I/O channel servers are responsible for sharing the I/O hardware resources. In an internal I/O configuration, this mapping is done in software by multiplexing requests from channels of multiple partitions through shared common I/O hardware. Partition relative physical addresses are obtained by virtual channel drivers from the system call interface implemented by the monitors and pass through the communication channels implemented by shared memory controlled by the ultravisor partition. The messages are queued by the client partition and de-queued by the assigned I/O server partition. The requested I/O server partition then converts the partition relative physical addresses to physical hardware addresses with the aid of the I/O partition monitor, and exchanges data with hardware I/O adaptors. The I/O partition monitor also may invoke the services of the partition (lead) monitor of the ultravisor partition and/or the guest partition's monitor, as needed. Command request completion/failure status is queued by the server partition and de-queued by the client partition. On the other hand, in an external I/O configuration, setup information is passed via the communication channels to intelligent I/O hardware that allows guest partitions to perform a signification portion of the I/O directly, with potentially zero context switches, by using a "user mode I/O" or direct memory access (DMA) approach.

The ultravisor partition design of the invention further permits virtualization systems operating on respective hosts hardware partitions (different hardware resources) to communicate with each other via the special infrastructure partitions so that system resources may be further allocated and shared across multiple host nodes. Thus, the virtualization design of the invention allows for the development of virtual data centers in which users may specify their hardware/software resource requirements and the virtual data center may allocate and manage the requested hardware/software resources across multiple host hardware partitions in an optimally efficient manner. Moreover, a small number of operations partitions may be used to manage a large number of host nodes through the associated partition resource services in the command partition of each node and may do so in a failover manner whereby failure of one operations partition or resource causes an automatic context switch to another functioning partition until the cause of the failure may be identified and corrected. Similarly, while each command partition system on each node may automatically reallocate resources to the resource database lists of different ultravisor resources on the same multi-processor node in the event of the failure of one or more processors of that node, the controlling operations partitions in a virtual data center implementation may further automatically reallocate resources across multiple nodes in the event of a node failure.

Those skilled in the art will appreciate that the virtualization design of the invention minimizes the impact of hardware or software failure anywhere in the system while also allowing for improved performance by permitting the hardware to be "touched" in certain circumstances. These and other performance aspects of the system of the invention will be appreciated by those skilled in the art from the following detailed description of the invention.

BRIEF DESCRIPTION OF THE DRAWINGS

A para-virtualization system in accordance with the invention is further described below with reference to the accompanying drawings, in which:

FIG. 7 illustrates the page table hierarchy implemented by the ultravisor system of the invention whereby the hierarchy of page sizes is always based on powers of $2^{10}$.

DETAILED DESCRIPTION OF ILLUSTRATIVE EMBODIMENTS

A detailed description of illustrative embodiments of the present invention will now be described with reference to FIGS. 1-15. Although this description provides detailed examples of possible implementations of the present invention, it should be noted that these details are intended to be exemplary and in no way delimit the scope of the invention.

DEFINITIONS, ACRONYMS, AND ABBREVIATIONS

3D-VE—Three-Dimensional Visible Enterprise. A 4 layer model of a data center including strategy, business processes, applications, and infrastructure.

ACPI—Advanced Configuration and Power Interface.

ADS—Automated Deployment System. It is designed to provide 'zero-touch' provisioning of server hardware. Naturally, this can also provision virtual server hardware.

ATA—AT Attachment (for low cost disks).

CMP—Cellular Multi-Processing.

DMZ—De-Militarized Zone. This is a typical perimeter zone between the Internet and an intranet.

DNS—Domain Name System (TCP mechanism for mapping host names to network addresses).

DSI—Dynamic Systems Initiative.

EFI—Extensible Firmware Interface. The EFI specification defines a new model for the interface between operating systems and platform firmware.

EM32T—Intel implementation of 64-bit extended x86 architecture.

HBA—Host Bus Adapter (disk storage adapter card).

Hypervisor—A mechanism for sharing host computer hardware that relies on low level context switches rather than a host operating system.

IPSEC—Internet Protocol Security (security standard for IP networks).

iSCSI—Internet SCSI protocol.

JBOD—Just a Bunch of Disks.

MSCS—Microsoft Cluster Services.

NIC—Network Interface Card.

PAE—Physical Address Extensions (mode of Intel processor that principally provides more than 32 bits of physical address).

PCI—Short for Peripheral Component Interconnect, a local bus standard developed by Intel Corporation.

PDE—Page Directory Entry (provides physical page address of page table that contains an array of page table entries (PTE)).

RDMA—Remote Direct Memory Access.

SAN—Storage Area Network.

SDM—System Definition Model. SDM is a model (of DSI) that is used to create definitions of distributed systems.

SSL—Secure Sockets Layer.

VCPU—Virtual CPU.

Virtual Data Center—a consolidation of virtual servers.

VPN—Virtual Private Network.

VT—Vanderpool Technology. A key Intel processor technology described briefly at recent Intel Developers Forums.

System Overview

Figure 1:
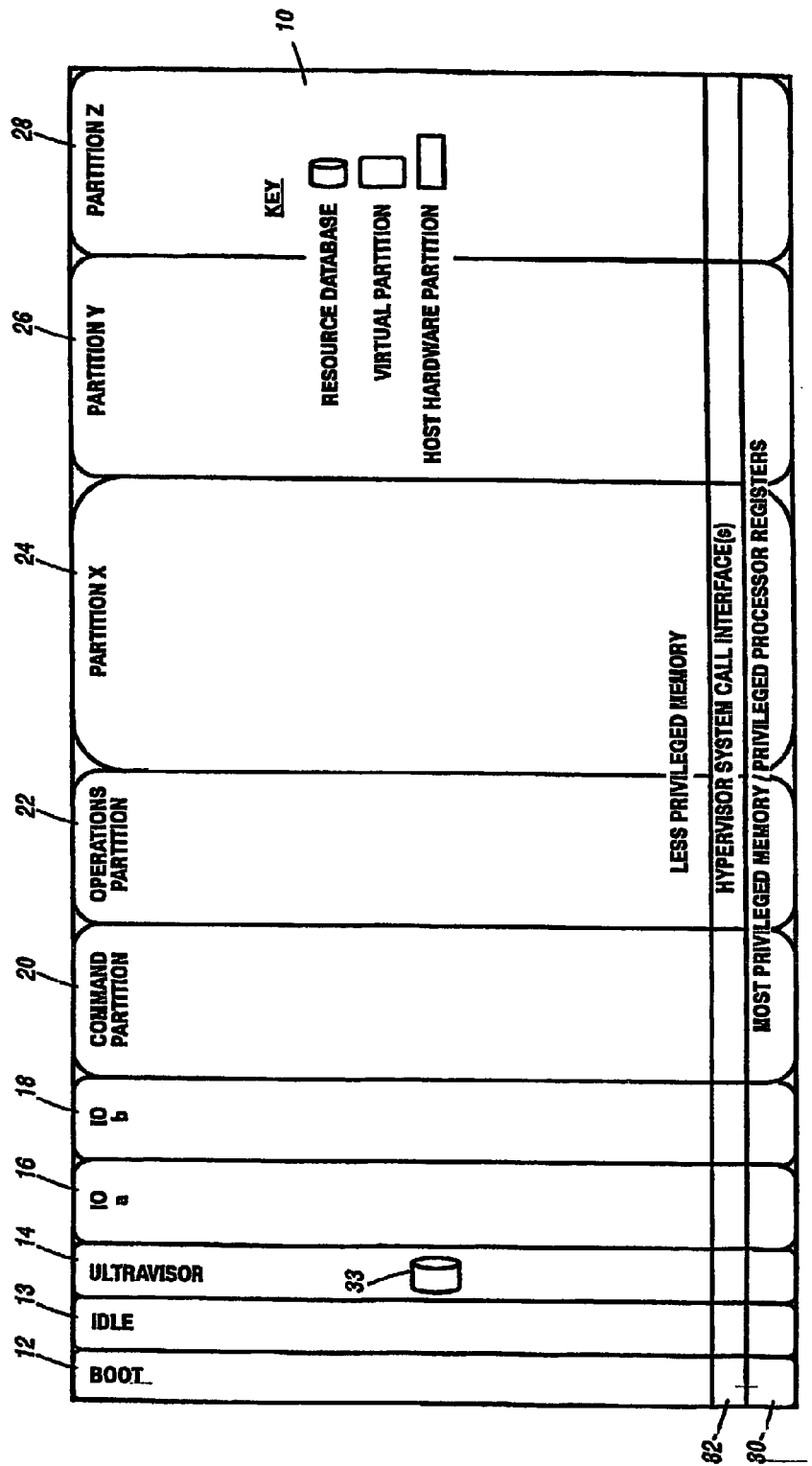
FIG. 1 illustrates the system infrastructure partitions on the left and user guest partitions on the right in an exemplary embodiment of a host system partitioned using the ultravisor para-virtualization system of the invention.

The present invention provides virtualization infrastructure that allows multiple guest partitions to run within a host hardware partition. This architecture uses the principle of least privilege to run code at the lowest practical privilege. To do this, special infrastructure partitions run resource management and physical I/O device drivers. FIG. 1 illustrates the system infrastructure partitions on the left and user guest partitions on the right. Host hardware resource management runs as an ultravisor application in a special ultravisor partition. This ultravisor application implements a server for a command channel to accept transactional requests for assignment of resources to partitions. The ultravisor application maintains the master in-memory database of the hardware resource allocations. The ultravisor application also provides a read only view of individual partitions to the associated partition monitors.

In FIG. 1, partitioned host (hardware) system (or node) 10 has lesser privileged memory that is divided into distinct logical or virtual partitions including special infrastructure partitions such as boot partition 12, idle partition 13, ultravisor partition 14, first and second I/O partitions 16 and 18, command partition 20, and operations partition 22, as well as virtual guest partitions 24, 26, and 28. As illustrated, the partitions 12-28 do not directly access the underlying privileged memory and processor registers 30 but instead accesses the privileged memory and processor registers 30 via a hypervisor system call interface 32 that provides context switches amongst the partitions 12-28 in a conventional fashion. Unlike conventional VMMs and hypervisors, however, the resource management functions of the partitioned host system 10 of FIG. 1 are implemented in the special infrastructure partitions 12-22. As will be explained in more detail below, these special infrastructure partitions 12-22 control resource management and physical I/O device drivers that are, in turn, used by operating systems operating as guests in the virtual guest partitions 24-28. Of course, many other virtual guest partitions may be implemented in a particular partitioned host system 10 in accordance with the techniques of the invention.

A boot partition 12 contains the host boot firmware and functions to initially load the ultravisor, I/O and command partitions (elements 14-20). Once launched, the resource management "ultravisor" partition 14 includes minimal firmware that tracks resource usage using a tracking application referred to herein as an ultravisor or resource management application. Host resource management decisions are performed in command partition 20 and distributed decisions amongst partitions in one or more host partitioned systems 10 are managed by operations partition 22. I/O to disk drives and the like is controlled by one or both of I/O partitions 16 and 18 so as to provide both failover and load balancing capabilities. Operating systems in the guest virtual partitions 24, 26, and 28 communicate with the I/O partitions 16 and 18 via memory channels (FIG. 3) established by the ultravisor partition 14. The virtual partitions communicate only via the memory channels. Hardware I/O resources are allocated only to the I/O partitions 16, 18. In the configuration of FIG. 1, the hypervisor system call interface 32 is essentially reduced to a context switching and containment element (monitor) for the respective partitions.

Figure 2:
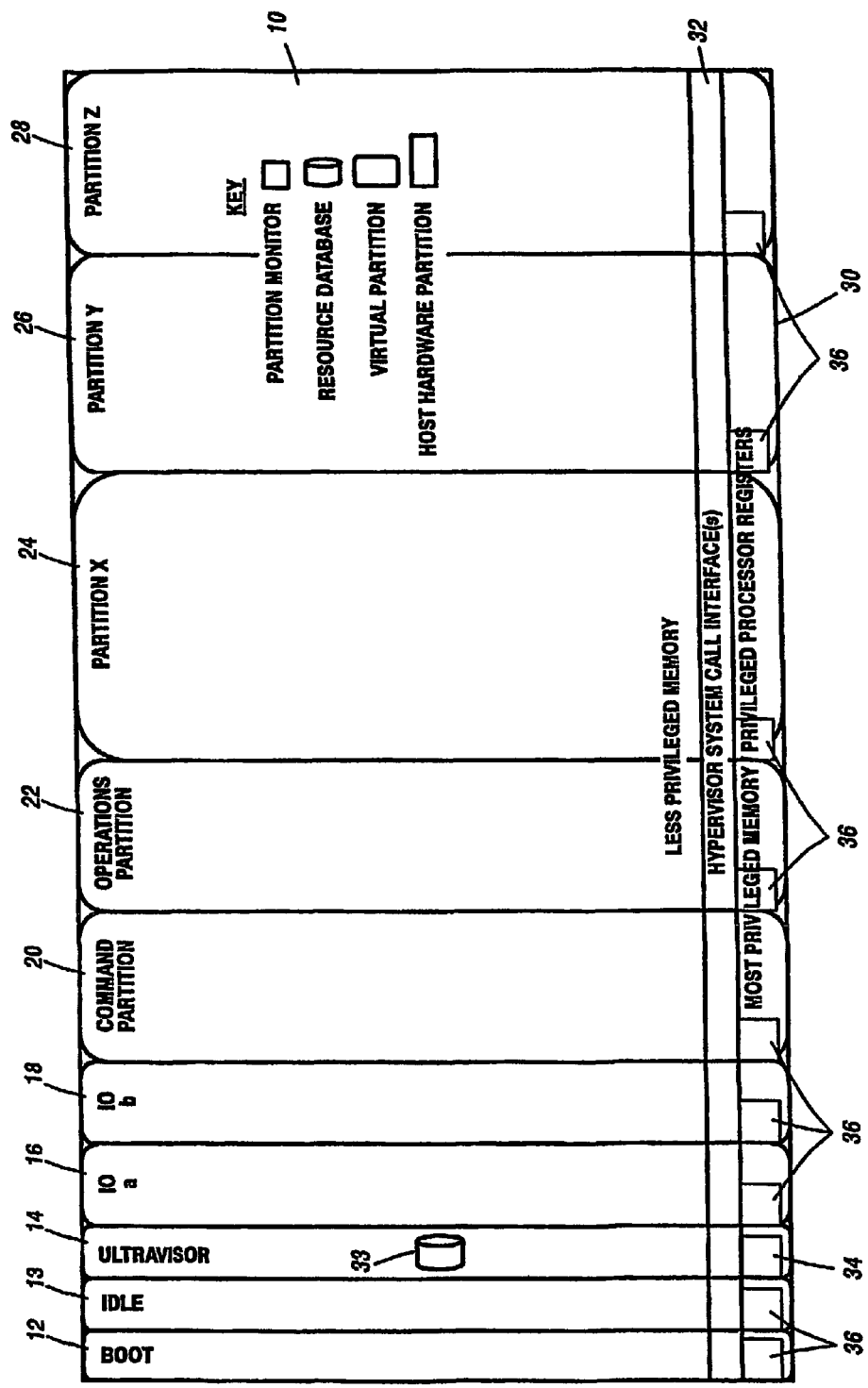
FIG. 2 illustrates the partitioned host of FIG. 1 and the associated virtual partition monitors of each virtual partition.

The resource manager application of the ultravisor partition 14 manages a resource database 33 that keeps track of assignment of resources to partitions and further serves a command channel 38 (FIG. 3) to accept transactional requests for assignment of the resources to respective partitions. As illustrated in FIG. 2, ultravisor partition 14 also includes a partition (lead) monitor 34 that is similar to a virtual machine monitor (VMM) except that it provides individual read-only views of the resource database in the ultravisor partition 14 to the associated virtual partition monitors 36 of each virtual partition. Thus, unlike conventional VMMs, each partition has its own monitor instance 36 such that failure of the monitor 36 does not bring down the entire host partitioned system 10. As will be explained below, the guest operating systems in the respective logical or virtual partitions 24, 26, 28 are modified to access the associated virtual partition monitors 36 that implement together with hypervisor system call interface 32 a communications mechanism through which the ultravisor, I/O, and any other special infrastructure partitions 14-22 may initiate communications with each other and with the respective guest partitions. However, to implement this functionality, those skilled in the art will appreciate that the guest operating systems in the virtual guest partitions 24, 26, 28 must be modified so that the guest operating systems do not attempt to use the "broken" instructions in the x86 system that complete virtualization systems must resolve by inserting traps; Basically, the approximately 17 "sensitive" IA32 instructions (those which are not privileged but which yield information about the privilege level or other information about actual hardware usage that differs from that expected by a guest OS) are defined as "undefined" and any attempt to run an unaware OS at other than ring zero will likely cause it to fail but will not jeopardize other partitions. Such "para-virtualization" requires modification of a relatively few lines of operating system code while significantly increasing system security by removing many opportunities for hacking into the kernel via the "broken" ("sensitive") instructions. Those skilled in the art will appreciate that the virtual partition monitors 36 could instead implement a "scan and fix" operation whereby runtime intervention is used to provide an emulated value rather than the actual value by locating the sensitive instructions and inserting the appropriate interventions.

The virtual partition monitors 36 in each partition constrain the guest OS and its applications to the assigned resources. Each monitor 36 implements a system call interface 32 that is used by the guest OS of its partition to request usage of allocated resources. The system call interface 32 includes protection exceptions that occur when the guest OS attempts to use privileged processor op-codes. Different partitions can use different monitors 36. This allows support of multiple system call interfaces 32 and for these standards to evolve over time. It also allows independent upgrade of monitor components in different partitions.

The monitor 36 is preferably aware of processor capabilities so that it may be optimized to utilize any available processor virtualization support. With appropriate monitor 36 and processor support, a guest OS in a guest partition (e.g., 24-28) need not be aware of the ultravisor system of the invention and need not make any explicit 'system' calls to the monitor 36. In this case, processor virtualization interrupts provide the necessary and sufficient system call interface 32. However, to optimize performance, explicit calls from a guest OS to a monitor system call interface 32 are still desirable.

The monitor 34 for the ultravisor partition 14 is a 'lead' monitor with two special roles. It creates and destroys monitor instances 36. It also provides services to the created monitors 36 to aid processor context switches. During a processor context switch, monitors 34, 36 save the guest partition state in the virtual processor structure, save the privileged state in virtual processor structure (e.g. IDTR, GDTR, LDTR, CR3) and then invoke the ultravisor monitor switch service. This service loads the privileged state of the target partition monitor (e.g. IDTR, GDTR, LDTR, CR3) and switches to the target partition monitor which then restores the remainder of the guest partition state.

The monitor 36 also maintains a map of resources allocated to the partition it monitors and ensures that the guest OS (and applications) in its partition use only the allocated hardware resources. The monitor 36 can do this since it is the first code running in the partition at the processor's most privileged level. The monitor 36 boots the partition firmware at a decreased privilege. The firmware subsequently boots the OS and applications. Normal processor protection mechanisms prevent the firmware, OS, and applications from ever obtaining the processor's most privileged protection level.

Unlike a conventional VMM, a monitor 36 has no I/O interfaces. All I/O is performed by I/O hardware mapped to I/O partitions 16, 18 that use memory channels to communicate with their client partitions. The primary responsibility of a monitor 36 is instead to protect processor provided resources (e.g., processor privileged functions and memory management units.) The monitor 36 also protects access to I/O hardware primarily through protection of memory mapped I/O. The monitor 36 further provides channel endpoint capabilities which are the basis for I/O capabilities between guest partitions.

The most privileged processor level (i.e. x86 ring 0) is retained by having the monitor instance 34, 36 running below the system call interface 32. This is most effective if the processor implements at least three distinct protection levels: e.g., x86 ring 1, 2, and 3 available to the guest OS and applications. The ultravisor partition 14 connects to the monitors 34, 36 at the base (most privileged level) of each partition. The monitor 34 grants itself read only access to the partition descriptor in the ultravisor partition 14, and the ultravisor partition 14 has read only access to one page of monitor state stored in the resource database 33.

Those skilled in the art will appreciate that the monitors 34, 36 of the invention are similar to a classic VMM in that they constrain the partition to its assigned resources, interrupt handlers provide protection exceptions that emulate privileged behaviors as necessary, and system call interfaces are implemented for "aware" contained system code. However, the monitors 34, 36 of the invention are unlike a classic VMM in that the master resource database 33 is contained in a virtual (ultravisor) partition for recoverability, the resource database 33 implements a simple transaction mechanism, and the virtualized system is constructed from a collection of cooperating monitors 34, 36 whereby a failure in one monitor 34, 36 need not doom all virtual partitions (only containment failure that leaks out does). The monitors 34, 36 of the invention are also different from classic VMMs in that each partition is contained by its assigned monitor, partitions with simpler containment requirements can use simpler and thus more reliable (and higher security) monitor implementations, and the monitor implementations for different partitions may, but need not be, shared. Also, unlike conventional VMMs, a lead monitor 34 provides access by other monitors 36 to the ultravisor partition resource database 33.

I. Ultravisor Para-Virtualization System

Partitions in the ultravisor environment include the available resources organized by host node 10. From a user perspective, the majority of partitions in an ultravisor environment are in fact virtual partitions. A virtual partition is a software construct (that may be partially hardware assisted) that allows a hardware system platform (or hardware partition) to be 'partitioned' into independent operating environments. The degree of hardware assist is platform dependent but by definition is less than 100% (since by definition a 100% hardware assist provides hardware partitions). The hardware assist may be provided by the processor or other platform hardware features. From the perspective of the ultravisor partition 14, a hardware partition is generally indistinguishable from a commodity hardware platform without partitioning hardware.

Throughout this application, a virtual partition should be assumed for any unqualified reference to a partition. Other terms related to (and generally synonymous with) virtual partition include: virtual server, virtual machine (VM), world, and guest OS.

Each page of memory in an ultravisor enabled host system 10 is owned by exactly one of its virtual partitions. The processor(s) in the host system 10 may be time shared amongst some of the virtual partitions by frequent context switches by the hypervisor system call interface 32 amongst virtual processors. Each hardware I/O device is mapped to exactly one of the designated I/O virtual partitions 16, 18. These I/O partitions 16, 18 (typically two for redundancy) run special software that allows the I/O partitions 16, 18 to run the I/O channel server applications for sharing the I/O hardware. Such channel server applications include Virtual Ethernet switch (provides channel server endpoints for network channels) and virtual storage switch (provides channel server endpoints for storage channels). Unused memory and I/O resources are owned by a special 'Available' pseudo partition (not shown in figures). One such "Available" pseudo partition per node of host system 10 owns all resources available for allocation.

Unused processors are assigned to a special 'Idle' partition 13. The idle partition 13 is the simplest virtual partition that is assigned processor resources. It contains a virtual processor for each available physical processor, and each virtual processor executes an idle loop that contains appropriate processor instructions to minimize processor power usage. The idle virtual processors may cede time at the next ultravisor time quantum interrupt, and the monitor 36 of the idle partition 13 may switch processor context to a virtual processor in a different partition. During host bootstrap, the boot processor of the boot partition 12 boots all of the other processors into the idle partition 13.

Multiple ultravisor partitions 14 are also possible for large host partitions to avoid a single point of failure. Each would be responsible for resources of the appropriate portion of the host system 10. Resource service allocations would be partitioned in each portion of the host system 10. This allows clusters to run within a host system 10 (one cluster node in each zone) and still survive failure of an ultravisor partition 14.

The software within a virtual partition operates normally by using what appears to the guest OS to be physical addresses. When the operating environment is capable, the partition physical address is the actual hardware physical address. When this is not possible, like for a guest OS limited by implementation or configuration to 4 GB, the ultravisor partition 14 maps the partition physical address to the appropriate hardware physical address by providing the appropriate additional necessary bits of the hardware physical address. For a partition with a maximum of 4 GB memory, a monitor 36 can describe the assigned physical memory with one 8K page map (two consecutive PAE PD tables) where the high 10 bits of the 32 bit partition relative physical address indexes the 1024 entries in the map. Each map entry provides a 64-bit (PAE) PD entry. By convention, bits 23-32 of the hardware physical address may match the least significant bits of the index.

A virtual processor definition may be completely virtual, or it may emulate an existing physical processor. Which one of these depends on whether Intel Vanderpool Technology (VT) is implemented. VT may allow virtual partition software to see the actual hardware processor type or may otherwise constrain the implementation choices. The present invention may be implemented with or without VT.

Ultravisor partition 14 concentrates on server input/output requirements. Little or no attempt is made to fully emulate legacy/traditional/client PC hardware. Plug and Play operating systems function with appropriate virtual port/miniport drivers installed as boot time drivers. The principal driver types are:

(Virtual Chipset)
Virtual Timers (RTC)
Virtual Storage (HBA)
Virtual Network (NIC)
Virtual Console (optional KVM for manual provisioning)

The hypervisor system call interface 32 may include an Extensible Firmware Interface (EFI) to provide a modern maintainable firmware environment that is used as the basis for the virtual firmware. The firmware provides standard mechanisms to access virtual ACPI tables. These tables allow operating systems to use standard mechanisms to discover and interact with the virtual hardware.

The virtual boot firmware 12 may provide certain BIOS compatibility drivers if and when necessary to enable boot of operating systems that lack EFI loaders. The virtual boot firmware 12 also may provide limited support for these operating systems.

Different partitions may use different firmware implementations or different firmware versions. The firmware identified by partition policy is loaded when the partition is activated. During an ultravisor upgrade, running partitions continue to use the loaded firmware, and may switch to a new version as determined by the effective partition policy the next time the partition is reactivated.

As noted above, virtual partition monitors 36 provide enforcement of isolation from other virtual partitions. The monitors 36 run at the most privileged processor level, and each partition has a monitor instance mapped into privileged address space. The monitor 36 uses protection exceptions as necessary to monitor software within the virtual partition and to thwart any (inadvertent) attempt to reference resources not assigned to the associated virtual partition. Each monitor 36 constrains the guest OS and applications in the guest partitions 24, 26, 28, and the lead monitor 34 constrains the resource management application in the ultravisor partition 14 and uses its access and special hypervisor system call interface 32 with the resource management application to communicate individual partition resource lists with the associated partition monitors 36.

Different partitions may use different monitor implementations or monitor versions. During an ultravisor upgrade, running partitions continue to use an existing monitor 36 and switch to a new version as determined by the effective partition policy when each of the virtual partitions choose to restart.

Virtual Partitions

There are two main categories of partitions in the ultravisor virtualization system of the invention. The 'user' partitions run guest operating systems for customer applications, and the ultravisor system infrastructure partitions provide various platform infrastructure services. For reliability, the ultravisor virtualization system architecture minimizes any implementation that is not contained within a virtual partition, since a failure in one partition can be contained and need not impact other partitions.

As will be explained in more detail below, ultravisor system partition types include:

Boot 12
Idle 12
Ultravisor 14
Command 20
Operations 22
I/O 16, 18

Boot Partition 12

The boot partition 12 has one (fractional) virtual CPU, and contains the hardware partition boot firmware. It is used during recovery operations when necessary to boot and reboot the command partition 20 and the I/O partitions 16, 18. During bootstrap, the boot partition 12 reserves almost all of available memory and constructs the ultravisor partition 14 and the initial resource map in resource database 33 with all memory assigned either to the boot partition 12, the ultravisor partition 14, or the 'available' partition. The boot partition 12 initiates transactions to the resource manager application until it has also booted the command partition 20. At this point the ultravisor partition 14 is attached to the command partition 20 and accepts only its command transactions. The boot partition boot processor also initializes all additional processors to run the idle partition 13.

Idle Partition 13

The Idle partition 13 has one virtual CPU for each physical CPU. These virtual CPUs are used as place holders in the ultravisor system's CPU schedule. If the ultravisor partition 14 or partition monitor 34 error recovery must remove a CPU/partition from the schedule, it is replaced with a reference to one of these virtual CPUs. Idle processors 'run' in the idle partition 13, rather than the ultravisor partition 14, to reduce the scope of error recovery should a hardware error occur while a hardware processor is idle. In actuality, the idle partition suspends a processor (to reduce power and cooling load) until the next virtual quantum interrupt. In typical scenarios, processors can be idle a significant fraction of time. The idle time is the current shared processor headroom in the hardware partition.

Ultravisor Partition 14

The ultravisor partition 14 owns the memory that contains the resource database 33 that stores the resource allocation maps. This includes the 'fractal' map for memory, the processor schedule, and mapped I/O hardware devices. For PCI I/O hardware, this map would allocate individual PCI devices, rather than require I/O partitions 16, 18 to enumerate a PCI bus. Different devices on the same PCI bus can be assigned to different I/O partitions 16, 18. An ultravisor resource allocation application in the ultravisor partition 14 tracks the resources, applies transactions to the resource database 33, and is also the server for the command and control channels. The ultravisor resource allocation application runs in the ultravisor partition 14 with a minimal operating environment. All state changes for the resource manager application are performed as transactions. If a processor error occurs when one of its virtual CPUs is active, any partial transactions can be rolled back. The hypervisor system call interface 32, which is responsible for virtual processor context switches and delivery of physical and virtual interrupts, does not write to the master resource maps managed by the ultravisor application. It constrains itself to memory writes of ultravisor memory associated with individual partitions and read only of the master resource maps in the ultravisor resource database 33.

Figure 15:
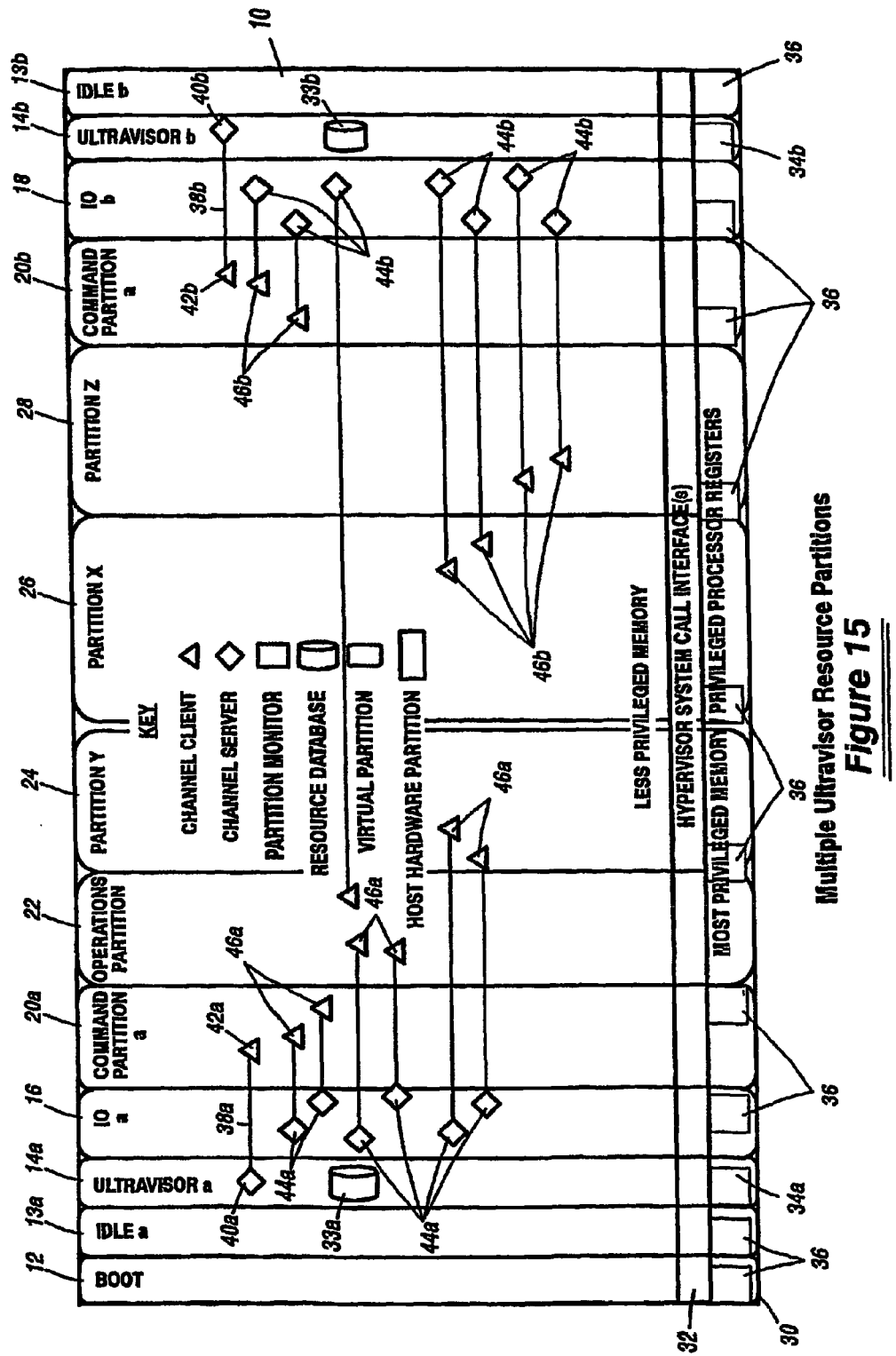
FIG. 15 illustrates the ultravisor host resources database partitioned into two resource databases in two ultravisor partitions.

As shown in FIG. 15, when multiple ultravisor partitions 14 are used, an associated command partition 20 is provided for each. This allows the resource database 33 of a large host to be (literally) partitioned and limits the size of the largest virtual partition in the host while reducing the impact of failure of an ultravisor partition 14. Multiple ultravisor partitions 14 are recommended for (very) large host partitions, or anytime a partitioned ultravisor system can contain the largest virtual partition.

Command Partition 20

The command partition 20 owns the resource allocation policy for each hardware partition 10. The operating environment is, for example, XP embedded which provides a .NET Framework execution environment. Another possibility is, for example, Windows CE and the .NET Compact Framework. The command partition 20 maintains a synchronized snapshot of the resource allocation map managed by the ultravisor resource management application, and all changes to the map are transactions coordinated through the command channel 38 (FIG. 3) with the ultravisor partition 14. The ultravisor application implements the command channel 38 to accept transactions only from the command partition 20.

It is conceivable that in a multiple host hardware partition environment, a stub command partition 20 in each host 10 could simply run in the EFI environment and use an EFI application to pipe a command channel 38 from the ultravisor partition 14, through a network, to a shared remote command partition 20. However, this would have an impact on both reliability and recovery times, while providing only a modest cost advantage. Multiple command partitions 20 configured for failover are also possible, especially when multiple ultravisor partitions 14 are present. Restart of a command partition 20 occurs while other partitions remain operating with current resource assignments.

Only a resource service in the command partition 20 makes requests of the resource manager application in the ultravisor partition 14. This allows actual allocations to be controlled by policy. Agents representing the partitions (and domains, as described below) participate to make the actual policy decisions. The policy service provides a mechanism for autonomous management of the virtual partitions. Standard and custom agents negotiate and cooperate on the use of physical computing resources, such as processor scheduling and memory assignments, in one or more physical host partitions. There are two cooperating services. The partition resource service is an application in the command partition 20 that is tightly coupled with the ultravisor resource manager application and provides services to a higher level policy service that runs in the operations partition 22 (described below) and is tightly coupled with (i.e. implements) a persistent partition configuration database, and is a client of the resource service.

The resource service also provides monitoring services for the presentation tier. The partition resource objects are tightly controlled (e.g. administrators can not install resource agents) since the system responsiveness and reliability partially depends on them. A catastrophic failure in one of these objects impacts responsiveness while the server is restarted. Recurring catastrophic failures can prevent changes to the resource allocation.

Operations Partition 22

The operations partition 22 owns the configuration policy for the domains in one or more host systems 10. The operations partition 22 is also where data center operations (policy) service runs. As will be explained below, at least one host 10 in a given virtual data center must have an operations partition 22. Not all host partitions 10 run an operations partition 22. An operations partition 22 may be provided by multiple hosts in a virtual data center for load balancing and failover. The operations partition 22 does not need to run within a given hardware partition, and need not run as a virtual partition. The operating environment is, for example, XP Professional or Windows Server 2003. This partition (cluster) can be shared across multiple hardware partitions. The configuration policy objects and ASP.NET user interface components run in the operations partition 22. These components can share a virtual partition with the command partition 20 to reduce cost for single host deployments.

For availability reasons, customization of partition resource agents is discouraged in favor of customization of policy agents. This is because a failure in a policy agent has less impact than a resource agent to the availability and responsiveness of the resource mechanisms. The policy agents make requests of the standard resource agents. The standard policy agents can also be extended with custom implementations. In simple single hardware partition installations, the services of the operations partition 22 can be hosted in the command partition 20.

The partition definition/configuration objects are intended to be the primary point of customization. The partition policy objects are clients of the resource objects. The policy service provides configuration services for the presentation tier.

The operations partition user interface components are typically integrated within the operations partition 22. An exemplary implementation may use HTML 4, CSS, and Jscript. The operations partition user interface is principally a web interface implemented by an ASP.NET application that interacts with the policy service. The user interface interacts directly with the Partition Policy Service and indirectly with a partition database of the operations partition 22.

A .NET smart client may also be provided in the operations partition 22 to provide a rich client interface that may interact directly with the policy and resource services to present a rich view of current (enterprise) computing resources.

Figure 4:
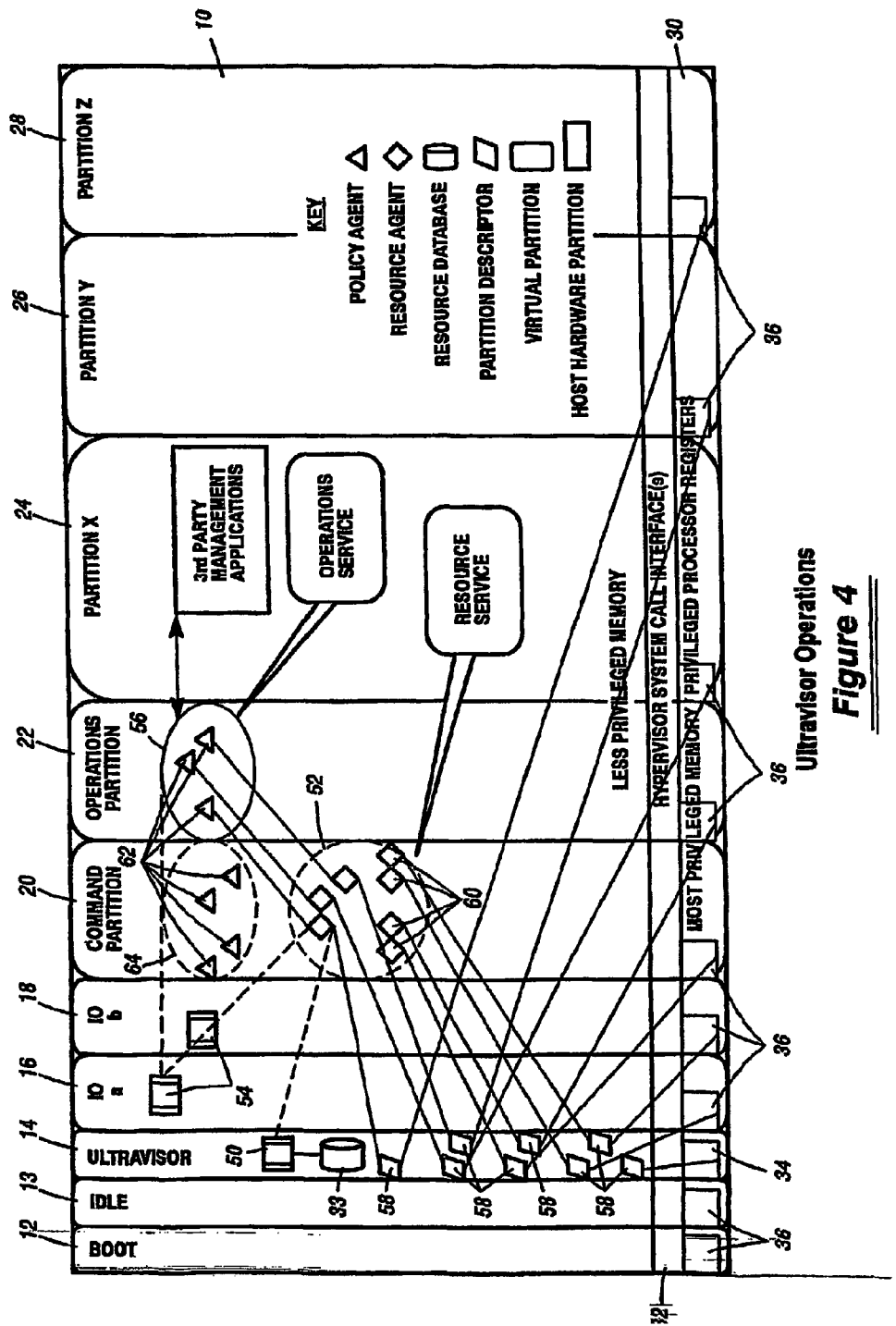
FIG. 4 illustrates the memory allocation of system and user virtual partitions, virtual partition descriptors in the ultravisor partition, resource agents in the command partition, and policy agents in the command partition and operations partition.

FIG. 4 illustrates a host 10 managed by an operations policy service in the operations partition 22. The operations policy service selects an available host and sends partition descriptions and commands to the resource service in the command partition 20 of the selected host 10. The resource service in the target command partition 20 selects appropriate resources and creates a transaction to assign the resources to the new partition. The transaction is sent to the ultravisor partition 14 which saves transaction request to un-cached memory as a transaction audit log entry (with before and after images). The transaction is validated and applied to the resource database 33.

An audit log tracks changes due to transactions since the last time the resource database 33 was backed up (flushed to memory), thereby allowing transactions to be rolled back without requiring the resource database 33 to be frequently flushed to memory. The successful transactions stored in the audit log since the last resource database 33 backup may be reapplied from the audit log to restart a failed partition. A resource also may be recovered that has been reserved by a completed transaction. A transaction that has not completed has reserved no resource. The audit log may be used by the ultravisor resource allocation software to rollback any partially completed transaction that survived the cache. It should be noted that a transaction that has not completed would have assigned some but not all resources specified in a transaction to a partition and the rollback would undo that assignment if it survived the cache.

I/O Partitions 16, 18

At least one, typically two, but potentially more I/O partitions 16, 18 are active on a host node 10. Two I/O partitions 16, 18 allow multi-path I/O from the user partitions 24-28 and allows certain types of failures in an I/O partition 16, 18 to be recovered transparently. All I/O hardware in host hardware partitions is mapped to the I/O virtual partitions 16, 18. These partitions are typically allocated a dedicated processor to minimize latency and allow interrupt affinity with no overhead to pend interrupts that could occur when the I/O partition 16, 18 is not the current context. The configuration for the I/O partitions 16, 18 determines whether the storage, network, and console components share virtual partitions or run in separate virtual partitions.

User Partitions 24-28

The user partitions 24, 26, 28 are why the ultravisor virtualization system is running. These are described in normal domains for the customer. Theses are the partitions that the customer primarily interacts with. All of the other partition types are described in the system domains and are generally kept out of view.

System Startup

When the host hardware partition 10 is booted, the EFI firmware is loaded first. The EFI firmware boots the ultravisor operating system. The EFI firmware uses a standard mechanism to pick the boot target. Assuming the ultravisor loader is configured and selected, boot proceeds as follows.

The loader allocates almost all of available memory to prevent its use by the firmware. (It leaves a small pool to allow proper operation of the firmware.) The loader then creates the ultravisor resource database's memory data structures in the allocated memory (which includes a boot command channel predefined in these initial data structures). The loader then uses the EFI executable image loader to load the ultravisor monitor 34 and ultravisor application into the ultravisor partition 14. The loader also jacks the boot monitor underneath the boot partition 12 at some point before the boot loader is finished.

The loader then creates transactions to create the I/O partition 16 and command partition 20. These special boot partitions are loaded from special replicas of the master partition definitions. The command partition 20 updates these replicas as necessary. The boot loader loads the monitor, and firmware into the new partitions. At this point, the boot loader transfers boot path hardware ownership from the boot firmware to the I/O partition 16. The I/O partition 16 begins running and is ready to process I/O requests.

The loader creates transactions to create a storage channel from the command partition 20 to an I/O partition 16, and a command channel 38 from the command partition 20 to the ultravisor partition 14. At this point the boot loader sends a final command to the ultravisor partition 14 to relinquish the command channel 38 and pass control to the command partition 20. The command partition 20 begins running and is ready to initialize the resource service.

The command partition operating environment is loaded from the boot volume through the boot storage channel path. The operating environment loads the command partition's resource service application. The resource service takes ownership of the command channel 38 and obtains a snapshot of the resources from the ultravisor partition's resource database 33.

A fragment of the policy service is also running in the command partition 20. This fragment contains a replica of the infrastructure partitions assigned to this host. The policy service connects to the resource service and requests that the 'boot' partitions are started first. The resource service identifies the already running partitions. By this time, the virtual boot partition 12 is isolated and no longer running at the most privileged processor level. The virtual boot partition 12 can now connect to the I/O partition 16 as preparation to reboot the command partition 20. If all I/O partitions should fail, the virtual boot partition 12 also can connect to the ultravisor partition 14 and re-obtain the boot storage hardware. This is used to reboot the first I/O partition 16.

The virtual boot partition 12 remains running to reboot the I/O and command partitions 16, 20 should they fail during operation. The ultravisor partition 14 implements watchdog timers to detect failures in these (as well as any other) partitions. The policy service then activates other infrastructure partitions as dictated by the current policy. This would typically start the redundant I/O partition 18.

If the present host system 10 is a host of an operations partition 22, operations partition 22 is also started at this time. The command partition 20 then listens for requests from the distributed operations partitions. As will be explained below, the operations partition 22 connects to command partitions 20 in this and other hosts through a network channel and network zone. In a simple single host implementation, an internal network can be used for this connection. At this point, the distributed operations partitions 22 start the remaining partitions as the current policy dictates.

All available (not allocated) memory resources are owned by the special 'available' partition. In the example of FIGS. 1 and 2, the available partition is size is zero and thus is not visible.

To illustrate the transactional nature of the creation of new partitions, the following is an approximate version of the transactions sent through the command channel 38 upon the creation of partitions X and Y. (The additional requests needed to define the virtual processors and channels are not shown.)

Simulated Transaction Log from create X (4 GB=1 4 GB page):
    Begin Transaction
    Change Owner Map [0,1,18], Index (25), from [0,1,20], to [0,1,25]
    Initialize Partition [0,1,25] ("X", UserX, . . . )
    Change Owner Map [0,1,0], Index (2), from [0,1,20], to [0,1,25]
    Commit Transaction
Simulated Transaction Log from create Y (1 GB=256 4 MB pages):
    Begin Transaction
    Change Owner Map [0,1,18], Index (26), from [0,1,20], to [0,1,26]
    Initialize Partition [0,1,26] ("Y", UserY, . . . )
    Change Owner Map [0,1,1], IndexRange (768,1023), from [0,1,20], to [0,1,26]
    Commit Transaction Here are approximate versions of logs of the subsequent transactions that destroy these partitions (assuming their channels and virtual processors have already been destroyed.)

Simulated Transaction Log from destroy X (4 GB=1 4 GB page):
    Begin Transaction
    Change Owner Map [0,1,0], Index (2), from [0,1,25], to [0,1,20]
    Change Owner Map [0,1,18], Index (25), from [0,1,25], to [0,1,20]
    Destroy Partition [0,1,25]
    Commit Transaction
Simulated Transaction Log from destroy Y (1 GB=256 4 MB pages):
    Begin Transaction
    Change Owner Map [0,1,1], IndexRange (768,1023), from [0,1,26], to [0,1,20]
    Change Owner Map [0,1,18], Index (26), from [0,1,26], to [0,1,20]
    Destroy Partition [0,1,26]
    Commit Transaction Ultravisor Memory Channels Virtual channels are the mechanism partitions use in accordance with the invention to connect to zones and to provide fast, safe, recoverable communications amongst the virtual partitions. Some of these 'logical' channels participate in resource filters but have no runtime behavior. For example, a power channel is used to associate a guest partition 24, 26, 28 with a specific zone of power although there may be no data interchange with the power zone. Metadata associated with channel type defines the cardinality rules that define how many instances of the channel type may be associated with a partition. For example: all of zero or more, all of one or more, exactly one, zero or one, highest rank of zero or more, or highest rank of one or more. Separate cardinality rules are specified for host and guest roles.

Virtual Channels provide a mechanism for general I/O and special purpose client/server data communication between user partitions 24, 26, 28 and the I/O partitions 16, 18 in the same host. Each virtual channel provides a command and I/O queue (e.g., a page of shared memory) between two virtual partitions. The memory for a channel is allocated and 'owned' by the client virtual partition 24, 26, 28. The ultravisor partition 14 maps the channel portion of client memory into the virtual memory space of the attached server virtual partition. The ultravisor application tracks channels with active servers to protect memory during teardown of the owner client partition until after the server partition is disconnected from each channel. Virtual channels are used for command, control, and boot mechanisms as well as for traditional network and storage I/O.

Figure 3:
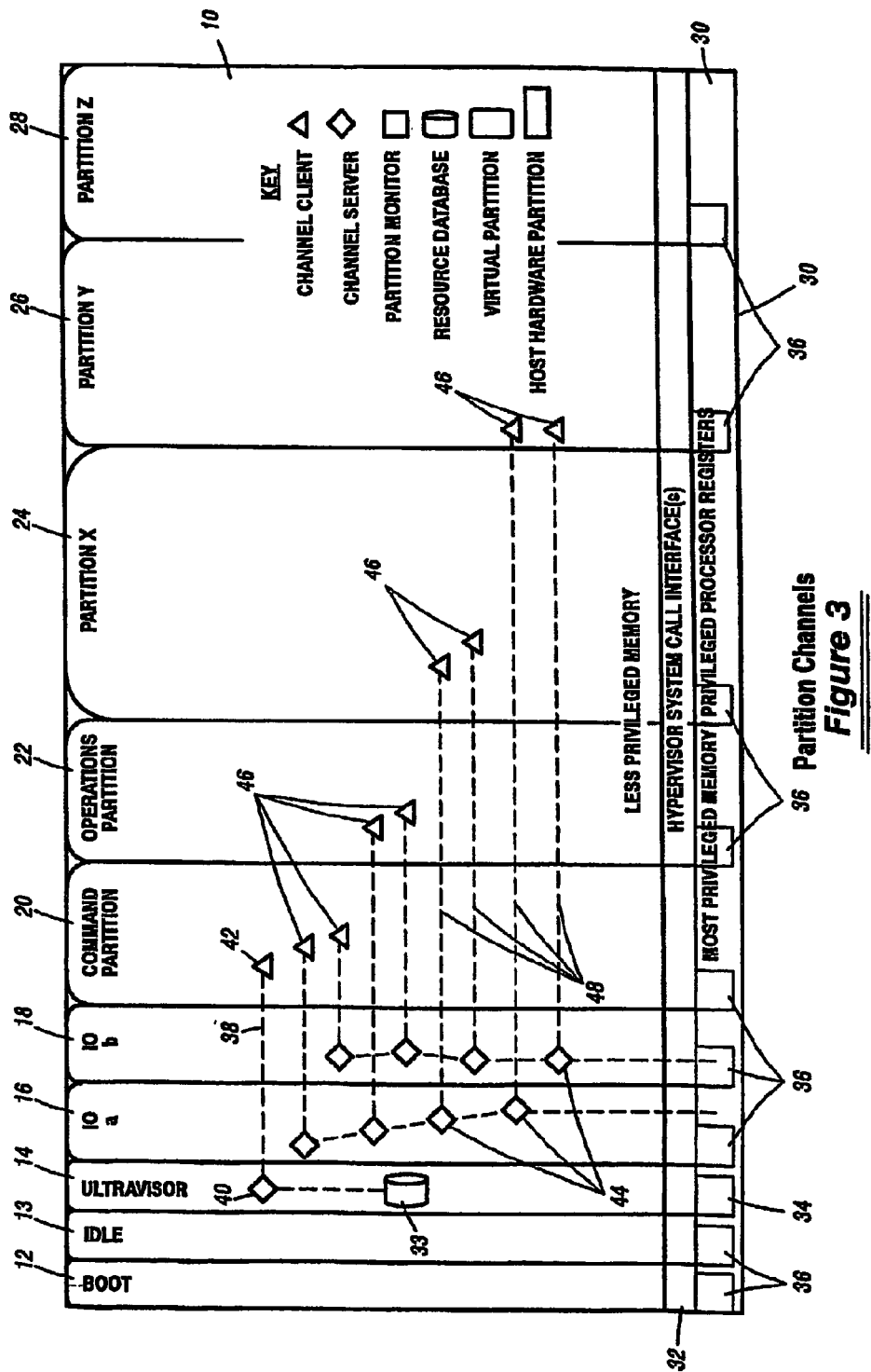
FIG. 3 illustrates memory mapped communication channels amongst the ultravisor partition, the command partition, the operations partition, the I/O partitions, and the guest partitions.

As shown in FIG. 3, the ultravisor partition 14 has a channel server 40 that communicates with a channel client 42 of the command partition 20 to create the command channel 38. The I/O partitions 16, 18 also include channel servers 44 for each of the virtual devices accessible by channel clients 46. Within each guest virtual partition 24, 26, 28, a channel bus driver enumerates the virtual devices, where each virtual device is a client of a virtual channel. The dotted lines in I/Oa partition 16 represent the interconnects of memory channels from the command partition 20 and operations partitions 22 to the virtual Ethernet switch in the I/Oa partition 16 that may also provide a physical connection to the appropriate network zone. The dotted lines in I/Ob partition 18 represent the interconnections to a virtual storage switch. Redundant connections to the virtual Ethernet switch and virtual storage switches are not shown in FIG. 3. A dotted line in the ultravisor partition 14 from the command channel server 40 to the transactional resource database 33 shows the command channel connection to the transactional resource database 33.

A firmware channel bus (not shown) enumerates virtual boot devices. A separate bus driver tailored to the operating system enumerates these boot devices as well as runtime only devices. Except for I/O virtual partitions 16, 18, no PCI bus is present in the virtual partitions. This reduces complexity and increases the reliability of all other virtual partitions.

Virtual device drivers manage each virtual device. Virtual firmware implementations are provided for the boot devices, and operating system drivers are provided for runtime devices. The device drivers convert device requests into channel commands appropriate for the virtual device type.

In the case of a multi-processor host 10, all memory channels 48 are served by other virtual partitions. This helps to minimize the size and complexity of the hypervisor system call interface 32. For example, a context switch is not required between the channel client 46 and the channel server 44 of I/O partition 16 since the virtual partition serving the channels is typically active on a dedicated physical processor. Although the ultravisor partition 14 can run in single processor host partitions, this would be appropriate only in limited circumstances (i.e. special test scenarios) since the I/O performance would not be optimal.

The low level format of the channel command queue for the communications between channel servers 44 and channel clients 46, for example, depends on the type of the virtual channel 48. Requests are issued via Command Descriptor Block (CDB) entries in the virtual channel 48. Requests with small buffers can include I/O data directly within the virtual channel 48. The data referenced by a CDB can be described by a Memory Descriptor List (MDL.) This allows the server I/O partition to perform scatter/gather I/O without requiring all I/O data to pass through the virtual channel 48. The I/O partition software interacts with the ultravisor partition 14 to translate virtual physical addresses into hardware physical addresses that can be issued to the hardware I/O adapters. As RDMA standards stabilize, this is a significant opportunity to optimize the channel performance through the I/O partition and monitor awareness of the RDMA protocols. For example, the ultravisor system of the invention can allow a large proportion of network reads to avoid all software copy operations on the path to the application network buffers.

Virtual channel interrupts are provided to keep virtual I/O latencies to a minimum. These are provided both for the virtual, device driver in the client virtual partition to signal command completions, and for the server I/O partition 16 to alert it to new command requests. Interrupts are not needed or generated for each command request, but are rather generated only for transitions in command queue state.

In an exemplary embodiment, the virtualization system of the invention targets only multiprocessor systems. This allows one or more processors to be dedicated to multiplexing virtual I/O through the I/O hardware. To maximize availability, the drivers executing on these processors are isolated within I/O virtual partitions 16, 18. Individual hardware devices are mapped directly for use by these I/O virtual partitions 16, 18. Typically, it is these I/O partitions 16, 18 that implement the Quality of Service (QoS) attributes for network and storage I/O requests in a particular zone.

A special mapped root bridge for the I/O virtual partitions 16, 18 may be provided to provide access to mapped I/O devices. In such an embodiment, only virtual partitions with a mapped root bridge have any access to hardware I/O devices. The root bridge maps the minimum number of buses necessary for the virtual partition to access the assigned hardware devices. The Mapped PCI Root Bridge provides the root mapped PCI bus, which is similar to the equivalent bus for normal partitions except for a modified enumeration mechanism (and access to configuration space.) The mapped bus is present only in the special I/O virtual partitions 16, 18. Support within Windows virtual partitions may be eventually required if and only if Windows Server is offered as an operating environment for the I/O virtual partitions 16, 18. In an embedded operating environment, the mapped bus may be simply virtual EFI firmware used to load custom EFI drivers and EFI applications that take total control of the virtual partition memory, processor and interrupts.

Virtual memory channels 48 provide a reliable and efficient path between user partitions 24, 26, 28 and the I/O partitions 16, 18. Preferably, the virtual channels 48 implement RDMA like mechanisms to allow efficient multiplexing of hardware interfaces for high throughput storage and network interfaces. As the only mechanism for cross partition communication, they also provide the means for the command partition 20 to communicate with the ultravisor partition 14. The following virtual channels are supported in an exemplary embodiment:

Monitor (Control)
Command
Firmware (Boot)
Console
Storage
Network
Power
Memory
Processor
Control The Control channel is the mechanism used by the ultravisor virtualization system to control the partitions. Commands to the channel bus driver in the virtual partition are delivered through the control channel. This channel provides a Message Signaled Interrupts (MSI) like mechanism to impact scheduling and reduce latency of I/O completions within a current quantum. The referenced zone may select the monitor implementation.

Command

As noted above, the Command channel 38 is the mechanism the command partition 20 uses to send commands to the ultravisor partition 14. All commands that change ultravisor state are transacted to allow recovery of both the command and ultravisor partitions. The referenced zone selects the ultravisor partition 14.

Boot

Monitors 36 do not perform any I/O. Instead, temporary boot channels allow application level ultravisor code to load partition firmware needed to boot new partitions. The command partition 20 is the server for the boot channel, and it reads the appropriate firmware image from storage directly into the new partition's boot channel. Thus, the boot channel is used to load monitor and firmware images into new partitions or 'clients'. The command partition 20 performs I/O directly into the boot channel. Once the virtual partition firmware is booted the channel is destroyed. The referenced zone selects the firmware implementation.

Console

The console channel is the mechanism to provide text and/or graphics consoles for the partitions. Partitions with automatic provisioning use the Windows Server 2003 headless capabilities with simple text consoles.

Storage

A storage channel is essentially a SCSI CDB (Command Descriptor Block) pipe from the virtual storage driver to the storage service virtual switch that multiplexes requests to the hardware storage interface. Each storage channel is associated with a storage network zone. Storage networks can be Ethernet (iSCSI), FC, or direct. Direct Attached Storage (DAS) is modeled as an explicit 'Storage Network' associated with a single host partition. In the case of a shared SCSI bus, the storage channel is associated with a small number (typically 1 or 2) of host partitions.

Network

A network channel implements an Ethernet pipe from a virtual network driver to a network service that implements a virtual Ethernet switch. The switch is optionally connected to a hardware network interface. Each network channel is associated with a network zone.

Power

A power channel is used to define virtual data center power zones. These might be different power phases or completely independent power sources potentially from different generation technologies (coal/gas/nuclear) that are routed to one of the physical locations where the virtual data is instantiated. Zero to n channel instances are allowed, and only one zone needs to be available. This allows guest partitions 24, 26, 28 to explicitly request power zones, and thus apportion related partitions to different power failure zones.

Memory

A memory channel is used to define virtual data center resource zones based on memory performance. Zero to n channel instances are allowed, and only one zone needs to be available. The zone of the lowest numbered guest channel is preferred. A host with multiple channels provides all of the referenced resource zones.

In operation, the command partition 20 selects the memory to be used for the channel and sends a transaction to the ultravisor partition 14 via command channel 38 to assign memory to the client partition and to create the channel definition. The monitor 36 for the client partition adds the memory pages to the client partition memory management (page) tables and sends a transaction to the ultravisor application to assign the channel server. The monitor 36 for the server partition similarly adds the memory pages to the server partition memory management (page) tables and sends a transaction to ultravisor application to notify the server partition control channel that a new channel is available.

Processor

A processor channel is used to define virtual data center resource zones based on processor performance. Zero to n channel instances are allowed, and only one zone needs to be available. The zone of the lowest numbered guest channel is preferred. Processor zones allow processor performance zones to be created. Hosts with higher processor performance can be associated with a high performance processor zone. Guest partitions that reference the processor zone will run on one of the hosts associated with the zone.

Processor Sharing

In addition to allocating memory, the ultravisor partition 14 allocates processor resources by sharing physical processors among virtual processors by limiting the actual privilege of the virtual processors. This allows control of the physical CPU to be maintained through control of the IDT (Interrupt Descriptor Table). Maintaining control of the IDT allows the ultravisor partition 14 to regain control of the physical processor as necessary, in particular for quantum timer interrupts. The hypervisor system call interface 32 uses this quantum timer interrupt to initiate virtual processor context switches. The frequency of the timer depends on the processor sharing granularity and performance tuning. When a physical processor is dedicated to one virtual processor, the timer frequency may be reduced for performance reasons since the quantum interrupts for processor context switches are not necessary.

The following description will note the available mechanisms for advanced OSs to be aware of the virtual environment. This is useful due to the bumpiness of virtual processor time that can occur. Interestingly, some of the power saving mechanisms exposed to the OS through ACPI also describe equivalent bumpiness.

In addition to the well known ACPI device power states (D0-D3) and system power states (S0-S5), ACPI also defines processor power states (C0-C3), processor performance states (P1-Pn), and processor duty cycles: 1–n, where n is defined by the hardware platform. When n=16, the duty cycle granularity is 6.25%.

Two characteristics of processor sharing potentially impact the OS. The first is time distortions. The second is performance which is proportional to power usage. Thus, inducing an OS to save power is an effective mechanism to control sharing. One goal is to ultimately allow an OS to participate in a performance feedback loop though these or other industry standard mechanisms.

Virtual processors share the hardware (logical) processor by conceptually using ACPI (Specification 2.0c) processor power and performance concepts. The processor sharing is modeled on ACPI processor clock throttling and processor performance states. A model of interleaved processor throttling duty cycles provides a very close match to the behavior of virtual processors sharing hardware processors.

Only virtual processors in the ACPI processor power state C0 need to be allocated actual processor clock cycles. However, in the short term, the target operating system is not expected to differentiate the power states of the allocated processors. This is primarily due to exposed processor affinities and the difficulty of allowing any of these to stop.

The degree to which the ACPI model in the virtual partition exposes the processor sharing model depends on the partition definition and policy. Those models that an operating environment are not 'mature' enough to handle properly are hidden from them. The primary advantage of the ACPI throttling model over the ACPI performance state (Px) model is that the former maps the bumpiness of the ultravisor processor sharing behavior directly to the operating system expectations. Those skilled in the art will further appreciated that P4 Software Controlled Clock Modulation (IA32 Vol 3, 13.14.3) provides an alternate mechanism via IA32_THERM_CONTROL MSR that provides a 12.5% sharing granularity.

For operating systems capable of comprehending ACPI throttling control, the current allocation can be exposed using ACPI P_CNT: THT_EN, DUTY_WIDTH values. A duty width of four bits provides a 6.25% granularity and allows 512 virtual partitions of minimum performance on a 32x host partition. The performance states provide adequate modeling of the relative performance but not the bursts inherent in the nature of the actual allocation needed to maximize cache effectiveness.

Figure 5:
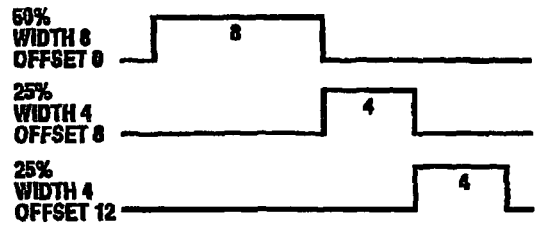
FIG. 5 illustrates processor sharing using overlapped processor throttling.

FIG. 5 illustrates overlapped processor throttling. As known by those skilled in the art, the ACPI duty cycle model allows virtual processors to share a physical CPU without knowledge. In this example, three partitions (8,4,4) A, B, C (A thinks it is using 8 cycles of 16; B thinks it is using 4 cycles of 16; and C thinks it is using 4 cycles of 16). By offsetting the duty cycle of B by 8 and of C by 12, all of the partitions understand the burst nature of the processor cycles they receive and assume the processor is saving power for the remainder of the cycle. In actuality, the processor is busy running a different virtual processor rather than saving power. Operating systems that don't understand this model may require minor adapts to prevent confusion from time anomalies.

Sophisticated multiprocessor operating systems that are capable of changing processor power states for virtual processors that are not currently utilized (perhaps unlike Windows Server 2003) allow the ultravisor partition 14 much greater control of the hardware processor resources. Only virtual processors in the ACPI C0 processor power state are allocated actual processor clock cycles. For example a 4x virtual partition with only one processor in the C0 state, only requires (a portion of) one physical processor and yet can maintain background activities through execution on the remaining virtual processor. When the demand on the virtual partition increases, the operating system can change some or all of the other processors into the C0 state. The ultravisor partition 14 will grant the access based on the current policy, partially starving or potentially migrating other lower priority virtual partitions if necessary.

The processor power states with the longest latency (for example C3) have the greatest potential for reclaiming and utilizing processor resources since the resource service in the command partition 20 can compute a processor schedule that completely excludes the processors at high latency power states. Processors at low latency states (for example C1) may only allow waiting low priority background virtual partitions access to one processor quantum at a time. The ultravisor provided virtual device drivers must be flexible and not prevent an OS from utilizing processor power states.

ACPI processor power states provide an API for a multi-processor OS to explicitly relinquish some virtual CPUs for relatively long periods of time. This allows the ultravisor system to compute a more efficient processor schedule (that only includes virtual processors in the C0 state). The latency of a change back to processor power state C0 is defined by how long it takes the ultravisor system to compute a new processor schedule that includes the virtual CPU.

Multiprocessor operating environments are beneficial in that they may support processor power states C2 and C3 during periods of low demand. This allows the resource agents in the command partition 20 to remove one or more virtual CPUs from the processor schedule until demand on the virtual partition increases.

Generally, the processor schedule implemented by the ultravisor partition 14 divides the physical processor cycles among the virtual processors. Virtual processors not in processor power state C0 (if any) are excluded from the schedule. The allocations are relatively long lived to maximize the effects of node local memory caches. The resource service in the command partition 20 computes a new schedule and applies it as a transaction to the ultravisor partition 14 that replaces the current schedule in an indivisible operation (when the old schedule would have wrapped to its beginning.)

Figure 6:
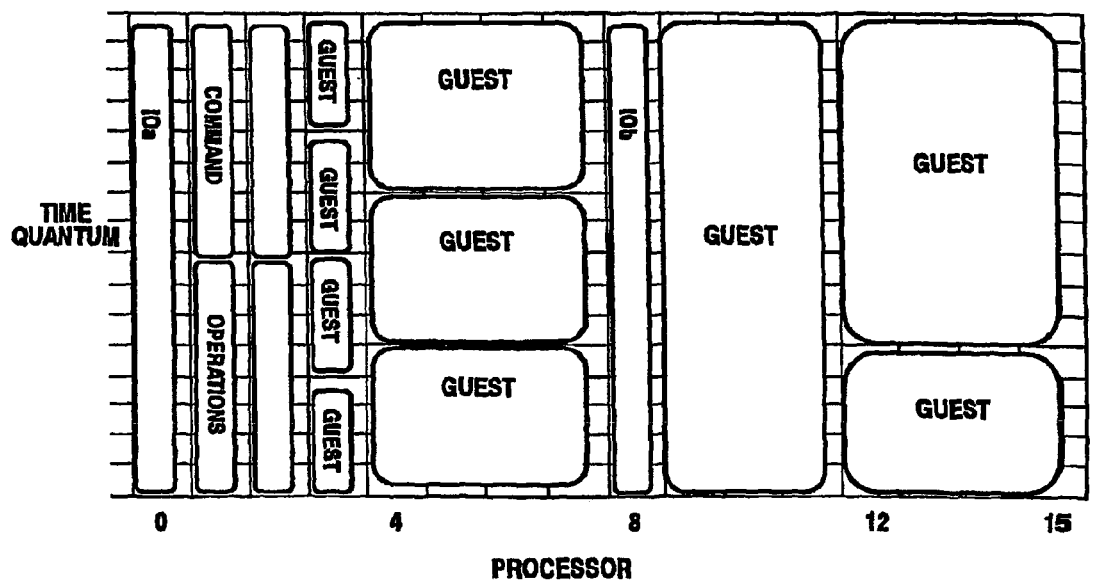
FIG. 6 illustrates a sample map of virtual processors to the time quantum's of the host physical processors.

FIG. 6 shows a sample map of virtual processors to the time quantum's of the host physical processors. The 'I/O-a' and 'I/O-b' virtual partitions are the redundant I/O partitions 16 and 18, each with a dedicated physical processor to minimize I/O latency. As illustrated, the command and operations partitions share a physical processor. The remaining 11 partitions represent user/guest partitions. The partitions are allocated resources automatically to maximize memory locality, cache affinity, and I/O performance.

As noted above, each hardware I/O device is mapped to one of the I/O virtual partitions 16, 18. Memory mapped I/O address space is reserved by recording allocation to the I/O virtual partition 16, 18 in the memory map.

Ultravisor Control Components

The architecture of the ultravisor partition 14 and its hypervisor system call interface 32 is designed such that the most critical components have the simplest mechanisms, and the higher level less critical (i.e. recoverable) components implement the more complex policy. The goal is to make rigorous inspection of the lowest level mechanism practical, and for all other levels to be recoverable.

Like a virtual partition monitor 36, the hypervisor system call interface 32 runs at the most privileged processor level. Its responsibilities are limited to virtual processor context switches and the delivery of hardware and virtual interrupts to the virtual partitions. The processor context switches are performed as transactions to allow containment should a serious error occur during the switch.

If a hardware interrupt is mapped to a processor of an I/O partition 16, 18 that is not allocated 100% of the associated hardware processor, the hypervisor system call interface 32 is responsible to 'pend' the interrupt until the next scheduled quantum of the I/O partition 16, 18. The hypervisor system call interface 32 makes no decisions and implements the allocation and schedules provided by the ultravisor resource manager in the ultravisor partition 14.

There may be a limited number of special transactions that can be initiated directly by the hypervisor system call interface 32. One such example is removing a virtual partition from the processor schedule by referencing the idle partition's processors in the evicted partition's place.

The monitor 34 for the ultravisor partition 14 is similar to the other partition monitors in implementation. It can be a simplified implementation since the ultravisor partition 14 is expected to run without dynamic paging. Its monitor can identity map the assigned physical memory to virtual addresses provided by the page table entries.

As noted above, the ultravisor partition 14 includes a transactional resource manager application that implements the command channel server 40. Through the lead monitor 34 for the host system 10, it provides the partition resource maps to the individual partition monitors 36 so that the respective monitors 36 may maintain containment of the OS in their associated partition.

In transactional systems, resource managers are the components that manage the resources and apply the transactions. Accordingly, to maximize the reliability of the ultravisor system of the invention, all changes to resource allocations are performed via transactions. The transaction request (which doubles as the change log) is flushed to (or copied to uncached) main memory before the transaction is applied. All changes are then flushed to main memory before the transaction is committed. This allows recovery from certain hardware faults that could occur during processing of a resource transaction. Note that the resource service initiates transactions infrequently (adjustments are made over minutes rather than milliseconds.) Thus, the reliability advantages overshadow any performance concern. The transaction requests explicitly include the before images which double as required preconditions for the transaction to commit. If a processor should fail when processing a request, a different processor can be used to rollback the failed transaction.

Boot Partition 12

EFI embedded boot firmware is booted by the hardware partition from the hardware partition system disk. A preferred but not required approach is the capability to load firmware as the hardware partition system firmware. As noted above, the bootstrap components for the ultravisor partition 14 are loaded as EFI drivers and/or EFI applications in the boot partition 12. These components create the ultravisor partition 14 and the initial resource map, load the ultravisor partition resource manger code, and then load the lead monitor system call interface 32 to begin context switches between the virtual partitions. The ultravisor monitor is loaded (as the lead monitor) and the ultravisor resource manager application is loaded as firmware (which may be stripped down or non-existent, minimally sufficient firmware to run the resource manager application). This firmware (as the boot partition 12) then proceeds to bootstrap the command partition 20 and I/O partitions 16, 18. Once these have been booted, the boot partition 12 remains idle until needed for recovery purposes.

Ultravisor Partition 14

The hypervisor system call interface 32 is mapped by the ultravisor partition 14. During bootstrap, special 'monitor' and 'firmware' images used only by this ultravisor partition 14 are loaded. The lead monitor 34 for this ultravisor partition 14 is responsible to handle the processor partition quantum timer interrupts, instruct the hypervisor system call interface 32 to perform the virtual processor context switches, and intercept any interrupts that need to be pended and delivered at a subsequent quantum context switch. The need for intercepted interrupts is minimized by assigning I/O interrupts to a physical processor dedicated to running the I/O virtual partitions 16, 18.

The 'firmware' for the ultravisor partition 14 is the ultravisor resource manager application for the hardware system 10. The ultravisor resource manager application runs in a less privileged level just like firmware in other partitions. This allows the hardware to (loosely) enforce the resource manager containment within memory explicitly allocated to the ultravisor partition 14 because the resource manager application may be permitted to modify its own hardware page table entries during special transactions that allocate new memory index tables. This software runs only within scheduled processor quanta of other virtual partitions, via a special virtual processor context switch, to process command and control channel requests. As illustrated in FIG. 15, the physical resources of a larger host may be partitioned and managed by separate independent ultravisor partitions 14.

The components of the ultravisor application are associated with each ultravisor partition 14. The resource manager application and lead monitor 34 provide the virtual partition infrastructure.

The core low level component of a host partition is the hypervisor system call interface 32. Although this element may be referred to as a kernel, there is no traditional kernel in the ultravisor architecture in accordance with the invention. The monitor 34 of the ultravisor partition 14 performs some of the functions of a VMM that are traditionally associated with a kernel.

For example, the principal functions of hypervisor system call interface 32 are to perform virtual CPU context switches and to deliver virtual interrupts. The data structures it references are owned by the ultravisor partition 14 and/or the guest partitions 24, 26, 28. This component is packaged together with the ultravisor partition monitor binary and is loaded as the monitor 34 of the ultravisor partition 14. Special scheduling is used for the partition resource manager in the ultravisor partition 14. The context switches from the Command partition VCPU (Virtual CPU) to ultravisor VCPU and back occur within the command partition 20 processor duty cycle. The client driver for the command channel 38 in the command partition 20 implements a request to execute transactions. This driver invokes the hypervisor system call interface 32 of the command partition's monitor 36, which performs a context switch to the hypervisor partition VCPU assigned to this physical CPU. When the ultravisor resource manager completes the transaction, it performs a return context switch to the command partition VCPU, which returns to the command channel driver which returns to the resource service.

The core control component of a host system 10 in accordance with the invention is the ultravisor resource manager. The resource manager is the component that manages the memory, processor, channel, and I/O resources of the physical host partition 10. It is like a database resource manager for the active resource assignments. This component is loaded as the 'firmware' of the ultravisor partition 14. The ultravisor Resource Manager Service runs within the context of the ultravisor virtual partition 14 though with a minimal operating environment. Virtual EFI firmware is not loaded into the ultravisor partition 14. Hardware failures when these VCPUs are active are survivable due to the transacted nature of all memory updates in this partition.

The resource manager provides low-level mechanisms to assign memory, processor, channel and I/O resources to (virtual) partitions. The resource manager exposes the active resource assignments in a manner similar to a transactional database in that it implements a transactional resource manager. The low level mechanism does not make policy decisions. This allows the implementation of a much simpler and reliable hypervisor mechanism. The resource manager provides services to the monitor instances 36 of the virtual partitions. The command partition 20 is the only other client, which is responsible for all hardware policy decisions for the host system 10. The operations partition 22 is its only client that is responsible for business policy priorities and decisions across multiple hosts (as in the virtual data center implementation described below).

The resource manager software that tracks host hardware resource usage employs transactional mechanisms so that it can recover from failed processors. Transaction logs with new state are always flushed to main memory during the commit processing. This prevents most processor failures during an ultravisor transaction from compromising the primary ultravisor data structures. A processor failure while running in a user partition will typically require only the virtual partition active on the processor to fail.

A memory channel is treated as a memory resource to be managed by the ultravisor partition 14. The memory channels are loosely based on RDMA design principles (i.e. avoid copy of data in I/O buffers whenever practical and possible and allow out of order completion of requests). A primary design issue is the reception of network packets. Unless hardware routing is supported, a copy of received packets will be required. Industry standards efforts in the RNIC space may be used. However, since copies can cause extra recovery work, a buffer set for recovery should live in the guest partition 24, 26, 28, be the responsibility of the guest's monitor 36, and be mapped by a ring buffer of descriptors that can be allocated to hardware by the I/O partition 16, 18. The I/O partition 16, 18 would read a network packet from a dumb NIC into an I/O partition buffer. The virtual Ethernet switch needs access to the packet header to determine the target partition. Once the target partition is known, the virtual Ethernet switch copies the packet from the I/O partition buffer directly to the client partition buffer. An intelligent network adapter could determine the target partition directly without the intermediate copy into an I/O partition buffer. An RNIC could at least do this for the a significant fraction of packets that have the greatest performance impact. If the I/O partition 16, 18 can obtain the header before reading the packet into main memory, than I/O partition buffers are not needed for the packet.

The monitor 34 is the portion of the ultravisor partition 14 that is distributed with an 'instance' in each virtual partition. Each monitor instance 'owns' the most privileged level of a given virtual partition. These distributed monitors 36 intercede between the ultravisor system and the firmware or operating system. Multiple implementations allow optimization of the tradeoffs based on the requirements of each virtual partition. Each implementation is identified in a manner similar to a strongly named .NET assembly (with a unique identifier and version information.)

If considered in object oriented terms, the implementation code is loaded into the ultravisor partition 14, and the partition instance data is associated with the monitored partition. The Vanderpool technology (VT) recently announced by Intel allows the monitor instance to be distinct from the virtual partition, and provides atomic operations to switch context from the monitor to the virtual partition. When a hardware processor is shared, the monitor instances cooperate to minimize context switches. VT may be implemented in an exemplary embodiment.

As shown in FIG. 4, each monitor 36 is repeated in the context of each partition to highlight its interaction with partition components. Each partition definition selects the monitor implementation. Lightweight operating environments may use lighter weight monitor implementations with potentially lower overhead. It is technically feasible to distribute special monitor implementations in add-on packages. The partition policy determines which monitor implementation is activated to monitor the partition actions.

The monitor 36 cooperates explicitly with the resource manager application. Each monitor 36 manages a complementary view of the partition resource assignments. The resource manager keeps an external view to recover the resources, while the monitor 36 keeps an internal view for efficient utilization of the resources. The monitor 36 also manages the details for a partition instance and runs at the most privileged level of the partition. The monitor 36 boots the virtual firmware after transitioning to a less privileged level with paging already enabled. The monitor 36 is the component that interacts with the processor virtualization technology when it is available. The monitor 36 further provides services for the virtual firmware, for firmware boot drivers, and for the ultravisor drivers (primarily the software bus driver) installed in the partition OS. The services for the OS kernel may rely on the ability of Vanderpool to be undetectable.

The virtual firmware provides a firmware implementation of virtual storage channel driver. This is used by OS loader firmware application to boot the OS. Once the OS is booted, OS specific virtual drivers replace the firmware drivers. The virtual firmware provides the standard EFI shell and the virtual storage and virtual network drivers, and it supports PXE based provisioning. The virtual partition firmware is a platform adaptation of Extensible Firmware Interface (EFI) adapted to run within a virtual partition. It adheres to the EFI 1.1 specification and is based on the sample implementation. This Virtual EFI implementation dispenses with standard drivers and provides boot drivers for the necessary memory channel types described herein. However, availability of an EFI iSCSI initiator would further allow an OS to boot from an iSCSI target. Where practical, the firmware runs at a less privileged level than the monitor 36. For example, the firmware runs in ring 1 in pages mapped by the monitor 36.

The OS runs at the same (less privileged) level as the firmware. The Intel Vanderpool Technology (VT), or server equivalent, allows operating systems to run without awareness of their existence in a virtual partition. However, minor changes for performance optimizations are still desirable for improved performance. This translates directly to better scalability and improved platform cost effectiveness.

For a Windows NT based operating system (i.e. Windows Server 2003), a software bus driver, a NDIS mini-port and storage-port mini-port are the principal drivers that interact with ultravisor components.

Command Partition 20

After bootstrap, the command partition 20 is the only client of the resource manager application. It communicates via the command channel 38 with the ultravisor partition 14. This allows an industry standard operating environment and runtime environment (i.e. the .NET Framework) to be used as the host for resource service software that implements the platform specific resource allocation algorithms. Should a fatal error within this partition ever occur, it is not fatal to other virtual partitions, since the command partition 20 can be restarted and can recover to the point of the last committed resource transaction.

The command partition 20 always runs as a virtual partition within the host 10 it manages. This allows sending resource requests through the local command channel and avoids dependencies on any I/O components. This allows minimal latency for resource rebalancing operations and therefore the critical hypervisor components require minimal independent capabilities.

The storage volume (image) of the command partition 20 contains the monitor and firmware images. The boot partition 12 has access to this storage volume (image) during boot of the host 10 to load the monitor 36 and firmware images. The storage volume can be a disk partition of the embedded attached storage. In an exemplary configuration of a two cell host (e.g. 16x 520 system) the embedded disk of each of the cells would host the storage of a command partition 20. This provides redundancy of the command partition storage.

The operating environment for the command partition could be Windows CE and the .NET Compact Framework.

Operations Partition 22

The operations partition 22 is the only permitted client(s) of the command partition 20. A secure network connection is used to exchange the resource transactions that control the active virtual partitions. As shown in FIG. 4, a processing element 50 in the ultravisor partition 14 is connected to the resource database 33 and to the resource service 52 of the command partition 20. A virtual Ethernet switch 54 in the I/O partitions 16, 18 is connected to both the resource service 52 and the operations service 56 to provide the secure network connection. The operations partition 22 operates the command partition 20. Whereas each host 10 has one or two command partitions 20, each virtual data center has one or two operations partitions 22. The operations partition storage volume (image) contains the virtual partition definitions for one or more domains of the virtual data center. Extracted copies of the partition definitions needed for bootstrap are stored in the command partition storage volume. The boot partition 12 accesses these definitions to boot the I/O partitions 16, 18 and the command partition 20. If the host includes an operations partition 22, the command partition 20 accesses its definition during the final stages of the host bootstrap.

The operations partition 22 can manage multiple command partitions 20, and multiple operations partitions 22 can manage the same command partition 20. The operations partition 22 can run as a virtual partition or in a dedicated hardware partition or industry standard system. The operations partition 22 also provides the point of integration with other platform management tools. The operations partition 22 runs the policy service as its primary application. Additional operations partitions 22 are optional add-ons and the standard location for management components of the platform management tools.

FIG. 4 shows memory allocation of system and user virtual partitions, virtual partition descriptors 58 in the ultravisor partition 14, resource agents 60 in the command partition 20, and policy agents 62 in the command partition 20 and operations partition 22. The lines in FIG. 4 connect the four entities that represent each virtual partition. As illustrated, the active partition object in the operations partition 22 (which is monitoring the partition operation events) is associated via the partition ID with a partition object in the command partition 20 (which is monitoring partition resources) and is associated via the partition ID with a partition descriptor 58 in the ultravisor partition 14 that describes allocated resources. The ultravisor partition 14 is, in turn, associated with a partition monitor 36 that constrains the partition to the assigned resources.

In FIG. 4, the ultravisor partition 14 has a partition descriptor 58 but no resource or policy agents. All of the other partitions have a resource agent 60 hosted by the resource service 52 in the command partition 20. The policy agents 62 for the system partitions {I/Oa, I/Ob, Command, Operations} needed to operate the host system 10 are hosted in a system domain by a policy service 64 running within the command partition 20. The policy agents for the user partitions {X,Y,Z} are hosted in a partition domain by a policy service 56 running within the operations partition 22.

When stopping partitions, resource reclamation of a partition is delayed until all server partitions have disconnected from the memory channels 48. This is needed so that any in-flight I/O is completed before client partition memory is reallocated. When stopping server partitions, all channels must be closed and disconnected first.

In FIG. 4, the operations partition 22 manages a 'conventional' persistent database of partition definitions. When a partition is activated (either automatic startup or explicit manual start), the operations partition 22 selects a host system 10 with required resources, connects to the resource service running in the host command partition 20, and provides the partition definition and start command to the resource service 52. The command partition 20 includes an application that matches requirements to available resources of a given host system 10. The command partition 20 uses a synchronized snapshot of the resource database of the ultravisor partition 14 to select appropriate resources for the activated partition. The command partition 20 creates a transaction to update and apply transaction to both the snapshot and the resource database 33 in the ultravisor partition 14.

As noted above, the ultravisor partition 14 manages the master resource database 33 of current (per host) resource assignments and supports simple transactions that allow the command partition 20 to change the assignment of the resources. Should the command partition 20 fail, a replacement command partition 20 would obtain a current snapshot and resume managing resources of the host system 10.

The operations service monitors the hosts 10. If a host should fail for any reason, the operations service 56 will choose a new host for the virtual partitions that had been assigned to the failed host. Operations services also monitor each other and can failover monitoring duties should the host 10 of an operations partition 22 fail.

To stop a partition, the operations partition 22 sends a request to the command partition 20. The command partition 20 sends a request to the ultravisor partition 14 to initiate a polite request to the guest partition operating system. (Note that non-responsive or unaware operating systems can be stopped or paused without their assent.) The ultravisor partition 14 sends requests through the monitor control channels to the server partition of all channels to which the guest partition is connected. Once the last of the channels has been disconnected, the ultravisor partition 14 sends an event through the command channel 38 to the resource service that creates a transaction to reclaim the resources of the guest partition. It should be noted that processor resources can be reclaimed immediately, but memory can not be reclaimed until after all memory channels 48 have been disconnected.

Thus, the operations partition 22 manages a 'conventional' persistent database (not shown) of partition definitions, while the ultravisor partition 14 manages an in memory database 33 of current (per host) resource assignments. The command partition 20 includes an application that matches requirements to available resources of a given host and applies transactions to both databases: to the ultravisor partition 14 to assign actual resources and to the operations partition 22 to record resource allocation usage history, for example.

Programmable Interfaces

The ultravisor application may include programmable interfaces that describe the extensibility of the ultravisor implementation. Programmability is provided by the policy service, which also provides a scripting model to allow simple scripts and scripted import/export of partition definitions. All user interfaces are clients of the programmable interfaces.

The policy service is responsible for the persistence of virtual partitions. The policy service provides the only programmable interface for non-ultravisor components and manages the persistence of a collection of domains with knowledge of other policy service instances (e.g. operations partitions) and knowledge of available host hardware partitions. A properly secured web services compatible interface may be provided. An interface may define the abstract interface for .NET remoting access to the policy service.

A resource adapter may be used by the policy service to interact with the resource service. This allows multiple resource service implementations. For example, a special adaptor for Microsoft's Virtual Server allows the data center service to manage guest partitions of multiple MS Virtual Server hosts. A resource server may implement the requests needed by the policy service as a .NET remoting, or any other equivalent, interface.

The resource service is responsible for proper operation of the CMP enterprise server. The standard security configuration limits clients to instances of the policy service. The service configuration includes a list of authorized policy service instances via, for example, a PKI mechanism like a list of custom certificates.

II. Ultravisor Memory Allocation

As noted above, the ultravisor architecture of the invention defines how the hardware resources are physically allocated to virtual partitions and how these virtual partitions are isolated from each other. The lowest layer provides a basic mechanism that is managed by higher layers. This approach makes strong reliability guarantees on the critical basic layer more practical than a monolithic approach can.

The allocation of physical resources is the key to the operation of the ultravisor partition 14. Efficiencies are realized by allocating at a very coarse scale as compared to a typical operating system. In comparison to an operating system, memory regions and processor cycles have very coarse grained allocations. The lowest level of the ultravisor partition 14 (the monitor 34) provides a simple mechanism. Higher level code (which can be recovered if it fails) is responsible for policy for the use of the basic mechanism.

A key feature of the virtualization system of the invention is its ability to readily scale as additional hardware resources are added. In a preferred embodiment, a scalable partition memory mapping system is implemented in the ultravisor partition 14 so that the virtualized system is scalable to a virtually unlimited number of pages. A log ($2^{10}$) based allocation allows the virtual partition memory sizes to grow over multiple generations without increasing the overhead of managing the memory allocations. Each page of memory is assigned to one partition descriptor in the page hierarchy and is managed by the ultravisor partition 14.

In the exemplary embodiment, the IA32 hardware tiered page size model is the basis of the ultravisor memory allocation (i.e., 4 KB pages with option of 4 MB large pages). Generalizing this approach allows allocations of very large memory sizes with a modest amount of overhead, and without incurring potential fragmentation issues. However, the ultravisor partition 14 does not attempt to match the special PAE tables (2 MB, 1 GB). This means that multiple consecutive processor PAE PDE entries are necessary to describe an ultravisor 4 MB page. The monitor 34 compensates as necessary for these platform hardware differences.

The ultravisor partition 14 avoids managing 4K pages whenever possible. This reduces (by 3 orders of magnitude) the number of pages the ultravisor partition 14 needs to track. Only the individual partition monitors need to track the majority of the small pages. This forgoes possibilities of transparently sharing pages between virtual partitions through tracking network requests between partitions and using hardware write protection and copy on write strategies to reduce total required memory. However, given memory capacity trends, this is not a significant liability.

The memory allocation 'page' map of the resource database of the ultravisor partition 14 is organized as a hierarchy of scales using 1K (1024) as the scaling factor. The map has 'fractal' characteristics since at each scale a single 4 KB index page describes the allocation of 1024 possible 'pages'. The index page for the contained scale can be allocated as one of the 1024 pages itself resulting in a maximum memory allocation overhead of 0.1% at the finest 4 KB allocation granularity. So, for example, the ultravisor partition 14 needs only one 4 KB page to track allocation of a 4 GB page in 4 MB granularity. Similarly, the ultravisor partition 14 needs only one 4 KB page to allocate a 4 MB page into 4 KB granularity for use by internal ultravisor system data structures. The index pages themselves are owned by the ultravisor partition 14.

A system with 4 TB of memory could support 1K 4 GB partitions. A single 4 KB page would describe this allocation. A single page would also similarly describe a system with 4 PetaBytes and 1K 4 TB partitions. In either case, additional pages are needed only to allocate internal ultravisor system data structures. A typical virtual partition is allocated some number of 4M pages that do not need to be contiguous. A larger virtual partition may be allocated one or more (larger) 4 GB pages.

In many cases, the assigned memory pages will be contiguous and allocated from the same node/cell as the assigned physical processors (that the resource service also chooses). Whether (or how much) the assigned memory really wants to be contiguous depends on the L1/L2/L3/L4 cache behavior. The resource service may purposely use non contiguous memory if it wants a partition to have a larger share of the L2/L3/L4 cache.

Each cache line typically maps to a limited number of memory regions, only one of which may be in the cache at a given time. If the memory is assigned to partitions linearly, the cache allocation is proportional to memory allocation. By stacking (or unstacking) allocation based on cache distribution, smaller or larger fractions of cache can be allocated. As used in this context, unstacking relates to a strategy that allocates memory so as to maximize the number of independent cache lines.

The ultravisor partition 14 contains mechanisms to migrate pages of memory from one physical region to another based on current resource demands and performance characteristics of the hardware platform. For example, if a virtual partition is scheduled onto a different set of processors, it may be advantageous to migrate the allocated memory to the same cell.

The ultravisor partition 14 needs only small portions of memory to track partitions. These are used for ultravisor descriptors/structures for partitions, channels, and processors. Memory is allocated in 4 GB or 4 MB units (large pages) whenever possible and practical. However, individual large pages are divided into small pages for ultravisor system data structures. All necessary ultravisor memory is allocated from the various sized page table like structures. Avoiding heaps allows the ultravisor partition 14 to run indefinitely as it never needs to be restarted to clean up memory fragmentation.

The ultravisor resource manager map need not have fast access. Its purpose is to provide a reliable mechanism to reclaim resources when a virtual partition is destroyed. It is used to reconstruct the map snapshot in the resource service and to pass the snapshot to the command partition 20 following recovery of the resource service partition.

It is the higher level control mechanism (the resource service 52 in the command virtual partition 20) that chooses which memory to allocate and assigns processors. As virtual partitions are deactivated, (or change sizes) the resource service 52 may choose to reallocate some of the partitioned memory and will send an appropriate transaction to the resource management application in the ultravisor partition 14 via the command channel 38.

Each monitor instance 36 will manage its own partial map (one for each virtual partition) optimized to validate and extend the base address field of page table entries (PTEs). A primary task of a monitor 36 is to constrain its virtual partition within its assigned physical addresses.

A monitor instance 36 obtains partition memory allocation information and the two basic mechanisms used to differentiate the control memory used by the ultravisor partition 14 and/or the monitor 36 to manage a partition, from the partition memory under control of the partition itself. One potential approach is using bit 30 in the index partition number values in classic U/S fashion, with partition memory indicated with U (bit clear) and ultravisor control memory identified with S (bit-set). An alternative approach is for the resource service to construct a memory list in the control channel when creating the partition.

Special partition descriptors (pseudo partitions) are used to mark ownership of reserved memory (e.g. available, not-installed, broken, etc.). This allows new reserved types to be introduced for use by higher level components without changes to the lowest levels of the ultravisor partition 14. This helps to reduce version upgrades of the lowest level components.

Rather than the derivation based on the (PAE, x64) evolution of the page table hierarchy defined by the Intel IA32 and EM32T architecture, the ultravisor system of the invention uses a hierarchy of page sizes always based on powers of $2^{10}$. FIG. 7 shows the first 4 scales of immediate interest to the ultravisor system. The higher scales accommodate continued Moore's law growth in system memory sizes. The Page Table and Page Entry columns propose a normalized nomenclature for referencing the page size hierarchy. The Intel nomenclature is included as a point of reference, although in PAE mode the scales are not an exact match. A standard definition of "prefixes for binary multiples" may be found at http://physics.nist-gov/cuu/Units/binary.html which was defined in December, 1998. Throughout this specification, the standard SI prefixes refer to base-two definition $\{(2^{10})^n\}$ rather than the decimal definition $\{(10^3)^n\}$.

As illustrated in FIG. 7, a 'page' can be explicitly defined as 1K (32 bit) 'words'. Thus, the typical 12 bit page offset is composed of a 10-bit ($2^{10}$) word index and a 2-bit byte index. In a 64-bit system, it is reasonable for a 'page' to be 1K 64-bit 'words' and to use a 3-bit byte index.

The conceptual definition of the ultravisor memory map is simply:

Dim MemoryMap [1024,1024,1024,1024] as Int32.

The values in the conceptual matrix are the partition numbers of the current page owners. The conceptual matrix is actually implemented more like a 'sparse' matrix or like a hierarchy of 4 KB page tables. When large pages are allocated, no memory is needed to map the 1024 smaller pages since, by definition, all have the same owner. So a more useful functional representation like an indexed property is:

Function GetMemOwner (T,G,M,K) As Int32.

For hardware partitions with less then 4 TB of memory, the fourth (from the right) dimension is always 0. For hardware partitions with less then 4 GB of memory, the third dimension is also always zero. When main memory is poised to exceed 4 PB, another dimension or two can be added.

Only page ownership is specified by this ultravisor memory map. Other memory characteristics (such as cache behavior) are managed by each virtual partition monitor 36 in conjunction with the resource service. If the memory implementation is architecturally 'limited' to a maximum of 1M virtual partitions (in each of 1K nodes), a single Int32 may specify the owner partition of each memory page. In one 4 KB index page, this maps each one of 1K 'pages' to one of 1M partitions.

The resource manager application may explicitly distribute the memory indexes and partition descriptors among the nodes (or cells) of the host system 10 to maximize locality of reference. This may be achieved by replacing the GB index in partition number with a node index as partially noted in FIG. 8. This provides 1K nodes with a maximum of 1M partitions before the index 'pages' would need expanding from 4K to 8K bytes.

A virtual partition number is a 32 bit index (2,10,10,10) into a map of 4K pages that identifies the virtual partition descriptor. The first bit is assigned to indicate suballocation in smaller pages. This is just like the large page bit in an Intel PDE but with opposite polarity. The next bit is initially reserved but may be utilized as U/S to identify memory owned by the partition but reserved for use by the ultravisor partition 14. This leaves three $2^{10}$ values to select scaled pages, which requires that the descriptors must all be in the first/same 4 TB range of a hardware partition (or same 4 MB of node/cell) memory. The master ultravisor index descriptor contains an int64 offset of this 4 TB range. The default (and initially only permitted) offset value is zero. In the case of the ultravisor partition 14, the page that precedes the ultravisor partition descriptor is reserved for this ultravisor index descriptor.

Figure 8:
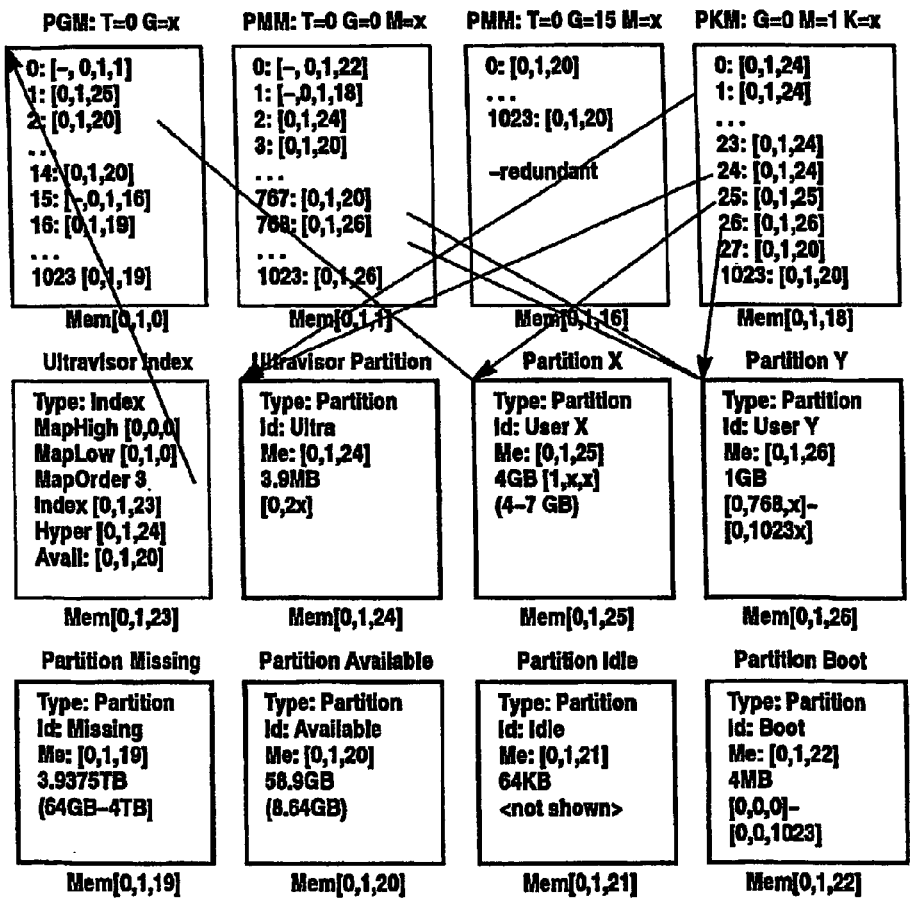
FIG. 8 illustrates an example of memory allocation of a 64 GB system for two user partitions X (4 GB) and Y (1 GB) in accordance with the invention.

FIG. 8 is an example that shows memory allocation of a 64 GB system for two user partitions X (4 GB) and Y (1 GB). At the top of FIG. 8 are depictions of the two forms of patterns that can occur as values in the memory map index pages. If the sign bit is set, the value represents a 'Memory Index Ref', which is a reference to an index page that divides the memory described by this item, but at the next smaller scale. If the sign bit is clear, the value is a 'partition number' that specifies the owner of this page. In FIG. 8, "[G,M,K]" represents a partition number, and "[-,G,M,K]" represents a memory index reference to the next smaller page scale. (The '-' is intended as an 'obvious' representation of the sign bit in an Int32.) For map index [-,G,M,K], Mem[G,M,K] provides the address of the map page that divides a given page into 1024 equal smaller pages. By definition, the partition descriptor for partition number [G,M,K] is at Mem[G,M,K]. This notation makes it easy to recognize valid partition numbers, since all 4 KB pages owned by themselves are partition descriptor pages.

Each box in FIG. 8 represents a 4 KB page of memory. The Mem[G,M,K] label under each box is the physical memory address of the page. The un-shaded pages contain the memory allocation database for this hardware host partition 10, while the shaded boxes represent the partition descriptors. Each of these partition descriptors corresponds to a valid partition number referenced from the memory map index pages. The partition number of each partition descriptor is represented within the descriptor next to the label 'Me' in [G,M,K] notation. Two special entries for "missing": [0,1,19] and "available": [0,1,20] define the partition numbers used in the memory map for missing (not installed) and available (not currently used) memory. (Note that these special partitions are never assigned processor resources.) The "ultravisor": [0,1,24] partition owns the memory needed for the memory map. This discussion ignores the Idle partition 13 and Boot partition 12. The transactions that created the two user partitions X: [0,1,25]; and Y: [0,1,26] and the transactions that reclaim their resources will be explained below.

The plain boxes in the first row of FIG. 8 represent pages of the memory map. These start at the second 4 MB page of physical memory Mem[0,1,0]. Pages Mem[0,1,2] through Mem[0,1,16] have been reserved in this sample to allow all of the 64 GB of memory to be allocated in 4 MB units. The usage of the assigned page at Mem[0,1,17] is not shown.

The 'Ultravisor Index' page is the master index to the memory map. The ultravisor index provides the address of the map and its maximum size. In FIG. 8, the page at Mem[0,1, 23] is the ultravisor index. This page contains information critical to decoding the memory map. MapHigh/MapLow provide a 60 bit reference to the index page that divides the physical memory into up to 1024 smaller pages. MapHigh defines which 4 TB of memory contains the top index page. In the example shown in FIG. 8, MapHigh must be [0,0,0] or E=0, P=0, T=0, which represents the first 4 TB, since the example does not have more than 4 TB of memory. MapLow is [0,1,0] which references the first 4K in the second 4 MB page. {The line in the diagram represents this reference to the largest scale page table.} The 'Order' value indicates the scale of the memory described by the memory map. In the example of FIG. 8, the order value of 3 (using scales from FIG. 7) indicates the largest scale page table is a PageGigaMap (PGM) where each of the 1024 PGE (PageGigaEntries) describes 4 GB of memory. It will be appreciated that a host with more than 4 TB requires an order 4 map, while a host with 4 GB or less can be described by an order 2 map, or by a larger map by simply marking all but the first 4 GB of memory as unavailable. The Index: [0,1,23] is a self reference for validation purposes. The Ultra: [0,1,24] value references the partition number of the ultravisor partition 14 that owns the memory of the memory map. The unnecessary Avail: [0,1,20] value identifies the partition number of the "available" pseudo partition. This value is not directly used by the ultravisor partition 14 but is useful for diagnostic purposes. In an actual map, there would be a reference to a page list that describes each node of the host. Each node would have its own "available" pseudo partition.

The PGM (PageGigaMap) page at Mem[0,1,0] allocates the memory in 4 GB pages. Note that since the host has only 64 GB of memory, entries 16-1023 contain [0,1,19] which allocates this 'missing' memory to the partition number of the 'missing' pseudo partition. In this example, entry 0: [-0,1,1] describes that the first 4 GB has been subdivided into 4 MB pages by the PMM (PageMegaMap) at Mem[0,1,1]. Entry 1: [0,1,25] describes that the second 4 GB has been assigned to partition number [0,1,25] which is "partition X". The line in FIG. 8 shows this allocation reference to Partition X. Entries 2-14 show 52 GB of memory is available for use as 4 GB pages. Entry 15: [-,0,1,16] describes the last 4 GB in the host which is subdivided into 4 MB pages by the PMM at Mem [0,1,16]. In the example of FIG. 8, all of the 4 MB pages in the last 4 GB happen to be available.

The PMM at Mem[0,1,1] allocates the first 4 GB in 4 MB pages. The "T=0 G=0" above the page is the context derived from walking the map to this page. G=0, since this page was referenced by index 0 in a PGM. Note that since the host has at least 4 GB, none of the entries references the "missing" pseudo partition. Entry 0: [0,1,22] allocates the first 4 MB page of physical memory at Mem[0,0,0] to the "boot": [0,1, 22] partition. Entry 1: [-,0,1,18] describes that the next 4 MB has been subdivided into 4 KB pages by the PKM at Mem[0, 1,18]. Entry 2: [0,1,24] allocates the next 4 MB to the ultravisor partition 14. Entries 3-767: [0,1,20] describe almost 3 GB of available memory. Entries 768-1023: [0,1,26] allocate 1 GB of memory (256 consecutive 4 MB pages) to partition number [0,1,26] which is Partition Y. The two lines in FIG. 8 represent this range of pages is assigned to Partition Y.

The PKM (PageKiloMap) at Mem[0,1,18] allocates the second 4 MB in 4 KB pages. The "G=0 M=1" above the page is the context derived from walking the map to this page. M=1 since this page was referenced by index 1 in a PMM. The higher scale context, G=0, is carried over from the PMM. Only a few of these pages are needed by the map and partition descriptors so entries 27-1023: [0,1,20] describe most of these as 'owned' by the "available" pseudo partition. Entries 24, 25, 26 reference partition descriptors for the ultravisor, X and Y partitions, respectively. The three lines in FIG. 8 next to these partitions depict the references to the respective descriptors. Entries 19-22 are not shown but reference the Missing, Available, Idle, and Boot partition descriptors. Entry 23 allocates the memory for the ultravisor index to the ultravisor partition 14. Entries 0,1,16, 18 allocate the pages of the map to the ultravisor partition 14. Entries 2-15,17 are not used and could be either available or reserved by the ultravisor partition 14.

The page at Mem[0,1,16] describes 1K consecutive 4 MB pages at address Mem[15,0,0] (this is the last 4 GB in the 64 GB hardware partition). Since all of the pages referenced by the map page have the same owner, the command partition 20 could create a transaction to merge the pages into one 4 GB page. Here are transactions that merge and then resplit this memory.

Merge 1K 4 MB into 4 GB
Begin Transaction
Merge Map [0,1,0], Index (15), {From Map [0,1,16], For [0,1,20]}
Change Owner Map [0,1,18], Index (16), from [0,1,24] to [0,1,20]
End Transaction
Split 4 GB at Mem [15,0,0] into 1K 4 MB pages at Mem [15,0 ... 1023,0]
Begin Transaction
Change Owner Map [0,1,18], Index (16), from [0,1,20], to [0,1,24]
Split Map [0,1,0], Index (15), Into Map [0,1,16], {For [0,1,20]}
Commit Transaction The following example shows how the command partition 20 sends transaction through the command channel 38 to the ultravisor partition 14 for the creation of partitions X and Y. What follows is an approximate version of the transactions sent through the command channel 38 as the additional requests needed to define the virtual processors and channels are not shown.

Simulated Transaction Log from create X (4 GB=1 4 GB page):
Begin Transaction
Change Owner Map [0,1,18], Index (25), from [0,1,20], to [0,1,24]
Initialize Partition [0,1,25] ("X", UserX, ... )
Change Owner Map [0,1,18], Index (25), from [0,1,24], to [0,1,25]
Change Owner Map [0,1,0], Index (2), from [0,1,20], to [0,1,25]
Commit Transaction
Simulated Transaction Log from create Y (1 GB=256 4 MB pages):
Begin Transaction
Change Owner Map [0,1,18], Index (26), from [0,1,20], to [0,1,24]
Initialize Partition [0,1,26] ("Y", UserY, ... )
Change Owner Map [0,1,18], Index (26), from [0,1,24], to [0,1,26]
Change Owner Map [0,1,1], IndexRange (768,1023), from [0,1,20], to [0,1,26]
Commit Transaction The following are approximate versions of logs of the subsequent transactions that destroy these partitions. (assuming their channels and virtual processors have already been destroyed.)

Simulated Transaction Log from destroy X (4 GB=1 4 GB page):
Begin Transaction
Change Owner Map [0,1,0], Index (2), from [0,1,25], to [0,1,20]
Change Owner Map [0,1,18], Index (25), from [0,1,25], to [0,1,24]
Destroy Partition [0, 1,25]
Change Owner Map [0,1,18], Index (25), from [0,1,24], to [0,1,20]
Commit Transaction
Simulated Transaction Log from destroy Y (1 GB=256 4 MB pages):
Begin Transaction
Change Owner Map [0,1,1], IndexRange (768,1023), from [0,1,26], to [0,1,20]
Change Owner Map [0,1,18], Index (26), from [0,1,26], to [0,1,24]
Destroy Partition [0,1,26]
Change Owner Map [0,1,18], Index (26), from [0,1,24], to [0,1,20]
Commit Transaction II. I/O Partition Operation As noted above, the I/O partitions 16, 18 map physical host hardware to channel server endpoints. The I/O channel servers 66 (FIG. 9) are responsible for sharing the I/O hardware resources 68 in I/O slots 70. In an internal I/O configuration, the I/O channel servers 66 do this in software by multiplexing requests from channels of multiple partitions through the shared common I/O hardware. Partition relative physical addresses are passed through the memory channels 48 to the I/O server partition 16, 18, which converts the addresses to physical (host) hardware addresses and exchanges data with hardware I/O adaptors. On the other hand, in an external I/O configuration (FIG. 10), the I/O channel servers 66 do this by passing setup information to intelligent I/O hardware 72 that then allows guest partitions 24, 26, 28 to perform a signification portion of the I/O directly, potentially with zero context switches using, for example, a 'user mode I/O' or RDMA (Remote Direct Memory Access) approach.

The monitor 36 of any partition is responsible for allocating physical memory from within the bounds assigned it by the resource manager application and for mapping virtual pages to physical memory as needed for the partition's operation. An I/O memory channel 48 is a piece of the physical memory that is shared by two or more partitions and is controlled by a set of methods that enables the safe and expeditious transfer of data from or to a partition. The channel contains the queued I/O data blocks defined by the OS virtual driver and control structures. A guest monitor never maps I/O or bus mapped I/O or memory into a guest OS environment. Physical device drivers always reside in I/O partitions 16, 18. This facilitates the uniform management of I/O resources across divergent OS images and hardware boxes, by providing a common model for redundancy, software upgrades, Quality Of Service algorithms, resource requirement matching and error recovery. I/O partition monitors 36 in addition to being able to map private memory can also map physical resources of I/O devices.

Internal I/O

Figure 9:
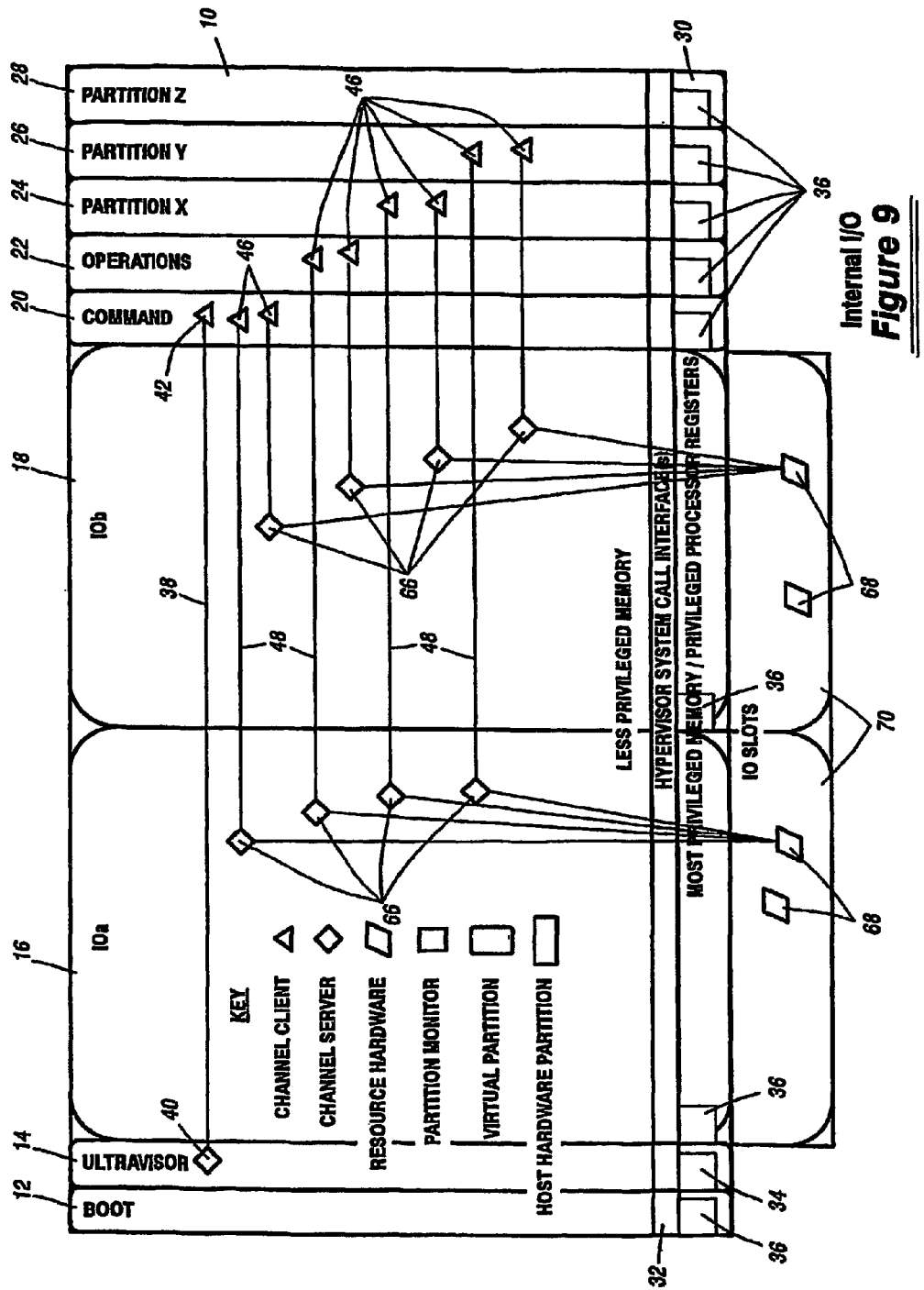
FIG. 9 illustrates internal I/O within a single host using resource hardware, such as PCI adapter cards, in I/O slots in the ultravisor system of the invention.

As illustrated in FIG. 9, internal I/O is accomplished using resource hardware, such as PCI adapter cards 68, in I/O slots 70. The internal I/O channels 48 are comprised of input, output and error queues. Each actor (client/server) owns a direction and only interrupts the other for resource and errors. I/O initiation and completion are handled by the same CPU and as such are scheduling drivers.

The virtual channel drivers and partition relative physical address would be in the guest partition 24, 26, 28 and obtained from the guest monitor 36. It is the addresses of guest (read/write) buffers that pass through the channel from the guest partition 24, 26, 28 to the I/O partition 16, 18. During operation, virtual channel drivers in the guest partition 24, 26, 28 obtain partition relative physical address from the guest OS or use the system call interface 32 to obtain physical address from the guest monitor 36 and pass the addresses to the I/O partition 16, 18 through respective memory channels 48 that requested access to the common I/O physical hardware. On the other hand, the I/O partition 16, 18 may use the system call interface 32 to reference the I/O monitor 36 to convert partition relative addresses to platform physical addressed or to verify addresses provided through the memory channel 48 from the client requesting I/O resources.

External I/O

Figure 10:
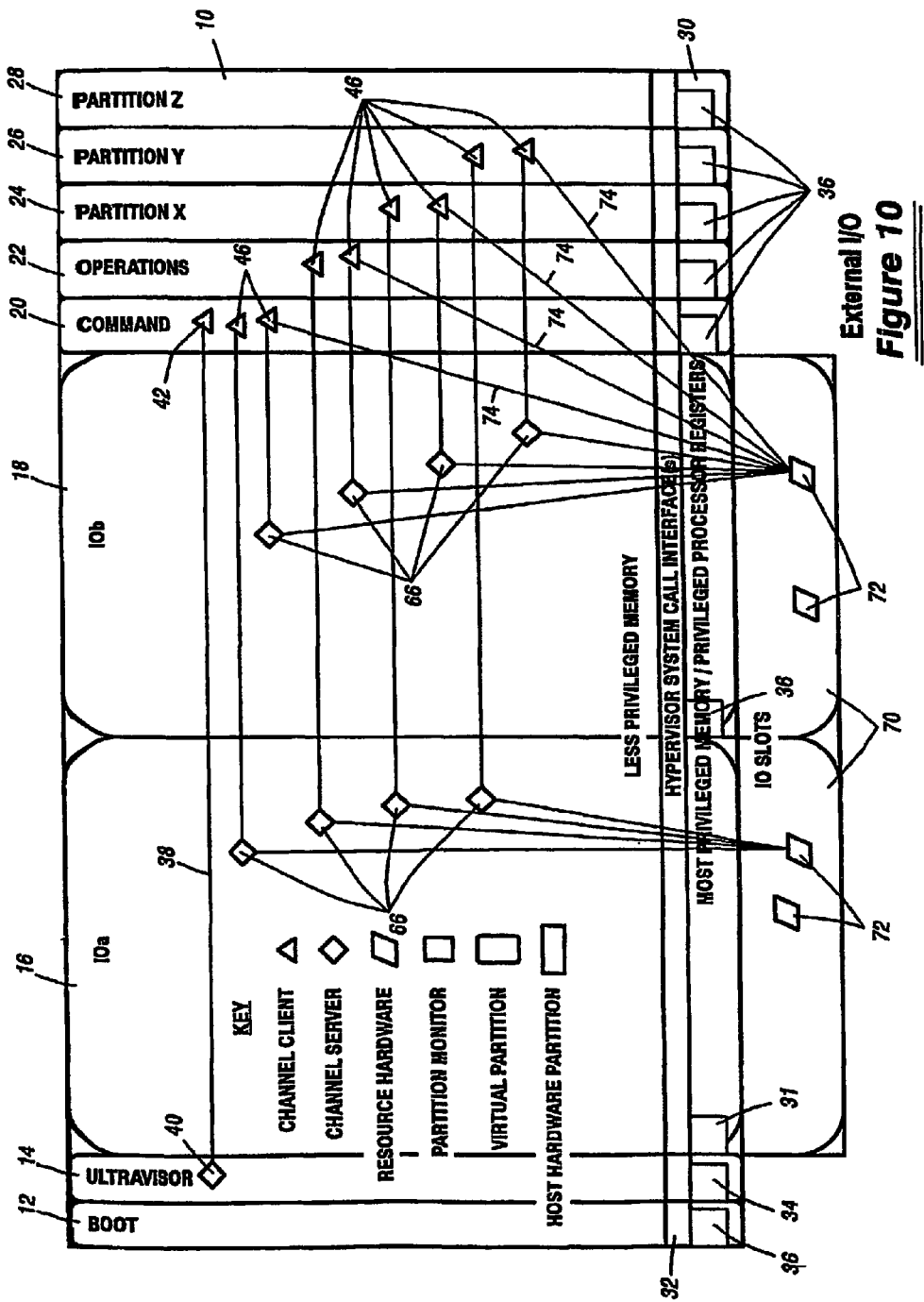
FIG. 10 illustrates external I/O using data connections from guest partitions directly to intelligent I/O adaptors in accordance with the invention.

As illustrated in FIG. 10, external I/O is accomplished using data connections 74 from guest partitions directly to intelligent I/O adaptors 72. In FIG. 10, this is shown in the adaptor of the 'I/O b' partition 18. The path through the I/O partitions 16, 18 is used to setup/teardown connections with the shared adaptors.

The typical communication path is a special direct channel 74 between the client partition and the intelligent I/O hardware 72. This does not require a context switch to the monitor 36 or a context switch of the I/O partition 18. However, a context switch may be required by a typical OS kernel. This approach limits the interrupts fielded by the I/O partitions 16, 18 and processor cycle requirements. In this configuration, the I/O partitions 16, 18 are typically allocated only a necessary fraction of a physical processor.

I/O Partition Components

The two I/O virtual partitions 16, 18 provide multi-path I/O via independent virtual memory channels 48 for the user partitions 24, 26, 28. Network and storage interfaces are divided among them. This minimizes recovery time should an I/O partition 16, 18 fail since immediate failover to channels served by the other I/O partition 16, 18 is possible. The failed I/O partition 16, 18 can be recovered and I/O paths redistributed for optimal performance. Of course, more than two I/O partitions 16, 18 are possible for environments with high bandwidth requirements. A single I/O partition 16 is sufficient for test environments without reliability requirements.

A virtual console provides KVM (keyboard/video/mouse) for partition maintenance consoles. For Windows, a Remote Desktop may provide the primary operations console. The remote console is provided by a console channel server and TCP stack running in a console server partition. This server may be hosted within an I/O partition 16, 18. Any non-isochronous devices could be remote. A virtual USB could potentially provide the implementation for the console keyboard and mouse.

Video implementation may be provided via the EFI UGA implementation. However, Windows may not support this.

A virtual network service should provide both IPv6 and IPv4 based networks. Preferably, a IPv6 native implementation (with sixteen byte addresses) is provided along with IPv4 interoperation. The network components provide a network type ultravisor memory channel implementation for a network interface card (NIC).

The I/O partition driver implementation is constrained for one or two hardware NIC devices. Adapters currently supported by the Windows Data Center program may be used.

A network implementation provides an integrated virtual Ethernet switch. A virtual firewall implementation may be provided by configuring a Linux firewall to run in a virtual partition.

The virtual storage service provides SAN storage for the virtual partitions and provides a storage type ultravisor memory channel implementation of a HBA, iSCSI and/or FC. Since the Windows iSCSI initiator can run over the network stack, a separate storage channel is not strictly unnecessary.

In a manner similar to the network service, the I/O partition driver implementation is constrained for one or two hardware HBA devices. Similarly, the adapters currently supported by the Windows Data Center program may be used.

IV. Virtualization Across Nodes

Zones

An ultravisor zone is an interconnected collection of resources. In an exemplary embodiment, zones are the visible manifestations of networks. Network details are left to network management products. A number of standard zone types are provided by the ultravisor partition 14. These correspond to the ultravisor channel types described above. Ultravisor add-ins can define additional zone types, and ultravisor administrators can define additional zone types for arbitrary categorization of host resources. These can be used to segregate resources by business unit or department, for example.

Guest partitions 24, 26, 28 are associated with the resource zones they require. Hosts 10 are associated with the resource zones they provide. The operations service 56 matches guests to hosts through the zones they have in common.

A partition of a network is called a network zone. The zone is the unit of resource allocation to networks for communications (Ethernet), storage (SAN), power, etc. A logical network with zones for describing other resources may include, for example, monitor and firmware components that can be shared by all partitions. In the real world, however, it is necessary to describe which partitions should share a particular monitor or firmware implementation. Rather than define yet another mechanism, it is simpler and more powerful to apply logical network zones to these dimensions as well. The host 10 maps a logical firmware zone to a particular firmware implementation. Guest partitions 24, 26, 28 that specify a firmware channel that reference this zone will use this implementation. This allows arbitrarily complex component life cycle patterns to be modeled and yet scales down to trivial installations where only a single version of a single implementation is available.

A network zone is a collection of network gear (switches/routers/cables) that can interchange packets of data. Different zones may or may not have gateways or firewalls to connect them. Hosts connected to a given zone have a name in some namespace. Typically DNS (Domain Name System) is used as the namespace for the host names. There is no requirement that hosts on a given zone all share the same DNS suffix (or not share the same DNS suffix). It will be appreciated by those skilled in the art that domains and zones are independent dimensions of a problem space: domains provide a namespace for things, while zones represent sets of things that are connected with wires. Zones can also describe power connections and memory and processor capabilities.

Domains

Figure 11:
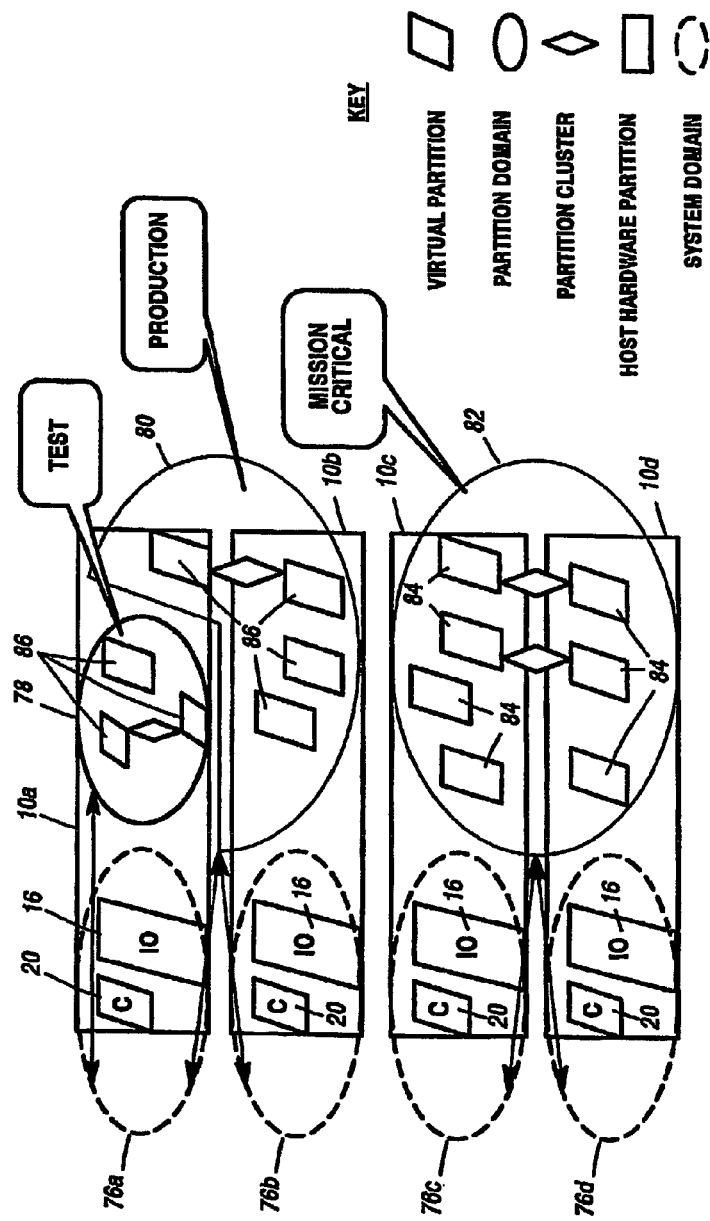
FIG. 11 is a Venn diagram that shows four host hardware partitions associated with corresponding system domains that are, in turn, associated with three partition domains.

Ultravisor domains define the namespace for all other objects and provide the containers and name space for partition objects and zone objects (an organization of networks). As illustrated in FIG. 11, a domain contains the system (infrastructure) partitions that implement the I/O and operations services used by the other partitions within a given host system 10. Each host system 10 has one dedicated system domain that is a partial replica of a system domain managed by a policy service in the operations partition 22. A system domain is created/selected each time the ultravisor partition 14 is installed in a host system 10. A host cluster and its corresponding partitions are created in the system domain and replicated to the host specific replica.

There are two distinct types of domains. Partition/user domains (partitions 24-28), and system domains (partitions 12-22). A system domain can contain many host partitions (with corresponding command/IO partitions). A partition/user domain is an active repository for virtual partition policy and configuration. The partition and system variants of a partition/user domain respectively manage user partitions and system infrastructure partitions. The partition/user domains contain the user partitions 24-28. Installing ultravisor partition 14 (and creating a virtual data center) results in at least one partition/user domain. Administrators may create additional ultravisor partition/user domains at any time. Each partition/user domain is associated with one or more system domains that identify potential host hardware partitions. The system domains, on the other hand, contain the system (infrastructure) partitions that implement the I/O and operations services used by the other partitions within a given host system 10. Each host system 10 has one dedicated system domain that may be a replica of a standard or custom template.

A policy service 56 in operations partition 22 provides integration interfaces with system management software. This may include an adapter for the system definition model (SDM) of the dynamic systems initiative (DSI). For scalability, extensibility and security reasons, partition policy is preferably organized into a collection of independent ultravisor domains.

Domains are the primary container objects in the ultravisor operations model. Each partition is a member of exactly one domain. Domains are useful for naming, operations, and security boundaries. Though domains are prevalent in other contexts (i.e. DNS, Active Directory, etc.), they are also natural containers for the ultravisor partition 14. Each ultravisor domain may be associated directly with a DNS domain name or alias, or indirectly through an Active Directory domain.

Ultravisor domains are used to simplify the policy of individual partitions by partially constraining partitions based on exclusive membership in one domain. Certain operational parameters are then specified once for each domain. Partitions can occasionally migrate between domains as necessary.

A configuration database may be implemented in the operations partition 22 as a file folder tree for each policy service instance with a simple subfolder for each domain. Each domain folder contains an XML file for each partition. Policy services 56 can communicate with each other to automatically create backup copies of domains for one another. Each domain is independently assigned to a database implementation. A database implementation provides the data store for one or more domains.

The domain defines the persistence container for software partitions and their configuration. When the ultravisor partition 14 is installed in a host system 10, one or more existing ultravisor domains can be identified. If this is the first ultravisor partition 14, the domain wizard assists the administrator in configuring the first domain. The persistence for the hardware partition system domain can be directly attached storage (DAS) or can share a database with any of the hosted domains. These objects can be associated with Active Directory domain or organization unit objects.

Site objects are useful to organize domains into virtual data centers; however, domains are typically limited to single site.

A network zone object defines an interconnected set of partitions. The ultravisor partition 14 can instantiate software Ethernet switches, routers and firewalls as necessary when partitions are activated. Hardware partitions can preload components needed to support all network zones identified by the hosted domains. A configuration with multiple host hardware partitions typically hosts different domains in different hardware partitions.

A partition configuration defines the limits of its configuration including available network channels that are associated with network zone objects. A virtual partition describes one or more configurations. Individual configurations can disable channels as necessary and override certain default configuration items.

The host systems 10 are explicit in the object model. The domains are associated with one or more host partitions. When multiple host partitions are associated with a domain, and partitions use SAN storage, policy determines the host 10 used to activate a partition.

Individual nodes of Windows server clusters and network load balancing clusters may be virtual partitions. Partition clusters may either span host partitions (default for server clusters) or may be contained within a host partition (moderately robust load balancing cluster) or may have multiple nodes within a host 10 and still span multiple host partitions. A load-balancing cluster may be associated with two host partitions, with half of the nodes hosted by each. This allows the cluster to survive a failure in a host partition, while maximizing processor utilization of each. Additional host partitions can be configured as necessary to reach the maximum number of cluster nodes.

Channels maintain type specific configuration information. A network channel maintains a two-way reference with a network zone object.

FIG. 11 is a Venn diagram that shows four host hardware systems 10*a*, 10*b*, 10*c*, and 10*d*. Each of these host hardware systems 10 is associated with a corresponding system domain 760*a*, 76*b*, 76*c*, 76*d*, respectively. In turn, the system domains 76 are associated with three partition domains 78, 80, and 82. The virtual partitions 84 in the 'Mission Critical' partition domain 82 are clustered so that they can run on two of the host hardware systems 10*c* or 10*d*, as illustrated. The virtual partitions 86 in the 'Production' domain 80 are also clustered so that they can run on the other two host hardware systems 10*a* or 10*b*. Virtual partitions 88 in the 'Test' domain 78 can run in only one of the production hosts (10*a*) and never in the hosts assigned to mission critical tasks (10*c* and 10*d*). Thus, in FIG. 11, the test cluster is running within a single host hardware system 10*a* while other nodes of virtual clusters may run in different host hardware systems 10.

In the context of the ultravisor system of the invention, partition agents are provided as key components of the ultravisor active object model in that the agents provide extensibility of behaviors by monitoring events and, based on partition policy, acting in the best interest of the partition. The partition agents are not responsible for managing policy, but reference policy when acting on events. Sophisticated behaviors may be added by adding partition agents.

A partition agent provides built-in expertise that allows (dramatic) simplification of the user interface. The agent provides intelligent constraints on administrator actions. The partition type defines the agent that negotiates (trades) for necessary resources. The agents may be implemented as .NET framework classes derived from EnterpriseServer.Partition.Agent class in EnterpriseServer.Partition namespace.

There are four basic combinations of partition agent types resulting from two scopes: Domain/Partition and two contexts: Policy/Resource. The resource agents 60 are responsible for actual allocations of hardware resources. The policy agents 62 help to manage configuration and choose which resource agents 60 represent them.

The policy service 56 may be connected to other components using adapters that are associated with hosts 10. Each resource service 52 has a corresponding resource adapter that maps the resource requests on the appropriate resource service requests. The policy service 56 loads the adapter assembly by name and uses activator interfaces to create the adapter instance.

Domain policy applies individually and collectively to the partitions in the domain. Key attributes are the importance of the partitions in the domain, maximum responsiveness requirements, as well as resource guarantees and limits of designated hosts that are divided by the partitions in the domain. Potential values for these attributes include:

Importance: Mission Critical/Production/Test/Development);

Responsiveness: (Infrastructure, Interactive, Interactive Transactions, Batch Transactions, Batch); and Host partitions: Available and preferred with associated resource guarantees and limits.

Domain policy is used by domain agents to prioritize resource utilization. Relative importance is of concern primarily when domains share a host hardware partition. For example, dedicating a host 10 to a development domain dedicates the host hardware to development partitions.

There are two basic categories of domain agents: domain resource agents, and domain policy agents. Each domain type has a corresponding agent. A domain policy agent selects an appropriate host hardware partition for its virtual partitions. This in effect enlists the corresponding domain resource agent on behalf of each partition the policy agent assigns to that host. Domain resource agents assign actual hardware resources. This simplifies the low level infrastructure code to focus on robustness and performance of the virtual context switches. The main task of the partition domain agent is contacting associated system domain agents that, in turn, match requested resource zones of guest partitions to a host 10 that has all of the required resource zones.

The domain agents provide services to partition agents. These services include selecting an appropriate host partition and communicating with the corresponding resource agents. Much of the automatic processing of the ultravisor partition 14 is handled by these agent interactions. The domain maintains a 'database' of actual resource utilization. This is used by the domain agent as a predictor of resource needs within the range allowed by the domain and partition policy. The expected resource needs are used to establish resource leases. The leases allow the agents to negotiate satisfaction of future resource needs and allow movement of virtual partitions to be scheduled in advance. This is a key enabler of automatically maintaining high utilization of the host partitions.

Partition policy 56 applies to individual partitions. It is subservient to domain policy. For example, a host 10 will limit resource usage of the domain even if it shortchanges individual partitions within the domain. It is the domain policy agent's responsibility to protect its partitions from resource starvation by assigning them to host partitions within the domain's allocated resource limits.

By way of example, Partition Policy attributes may include:

min/max processor (cycles captured every n minutes);
min/max memory (reserved give backs);
channel I/O request rate (reserve/cap);
channel I/O bandwidth (reserve/cap); and
Partition relative priority.

Ultravisor partition agents are ultravisor 'components' that focus on the operational needs of one partition. The ultravisor operations partition 22 manages collections of these agents to affect the operations of the partitions when implemented in a virtual data center. There are two basic categories of partition agents: resource agents, and policy agents. There is at least one agent type in each category. The operations framework is extensible and allows for the addition of new types in these categories. The type of agent that represents the partition is one of the attributes selected when new partitions are created.

The ultravisor resource service 52 hosts resource agents for the partitions. Simple agents are used to negotiate for partition resources based on the policy assigned to the partition. Partitions with active resource agents are said to be active. The active and inactive partition states are associated with resource agents.

The policy service 56 hosts partition policy agents. The service 56 is typically hosted by the operations partition 22 for user partitions 24, 26, 28. For entry level single host partition installations, the service 56 can be hosted by the command partition 20 to minimize costs. The service is always hosted by the command partition 20 for ultravisor infrastructure partitions. These agents negotiate with the host system 10 to activate a resource agent, and then collaborate with the resource agent 60 by providing the configuration and policy the resource agent 60 needs while the partition is active. The partition life cycle stages are associated with policy agents 62. Partitions with active policy agents 62 are said to be operating. These agents 62 are capable of managing simple part time partitions. The agent tracks the scheduling requirements and negotiates with host systems 10 to activate a resource agent 60 as necessary.

Figure 12:
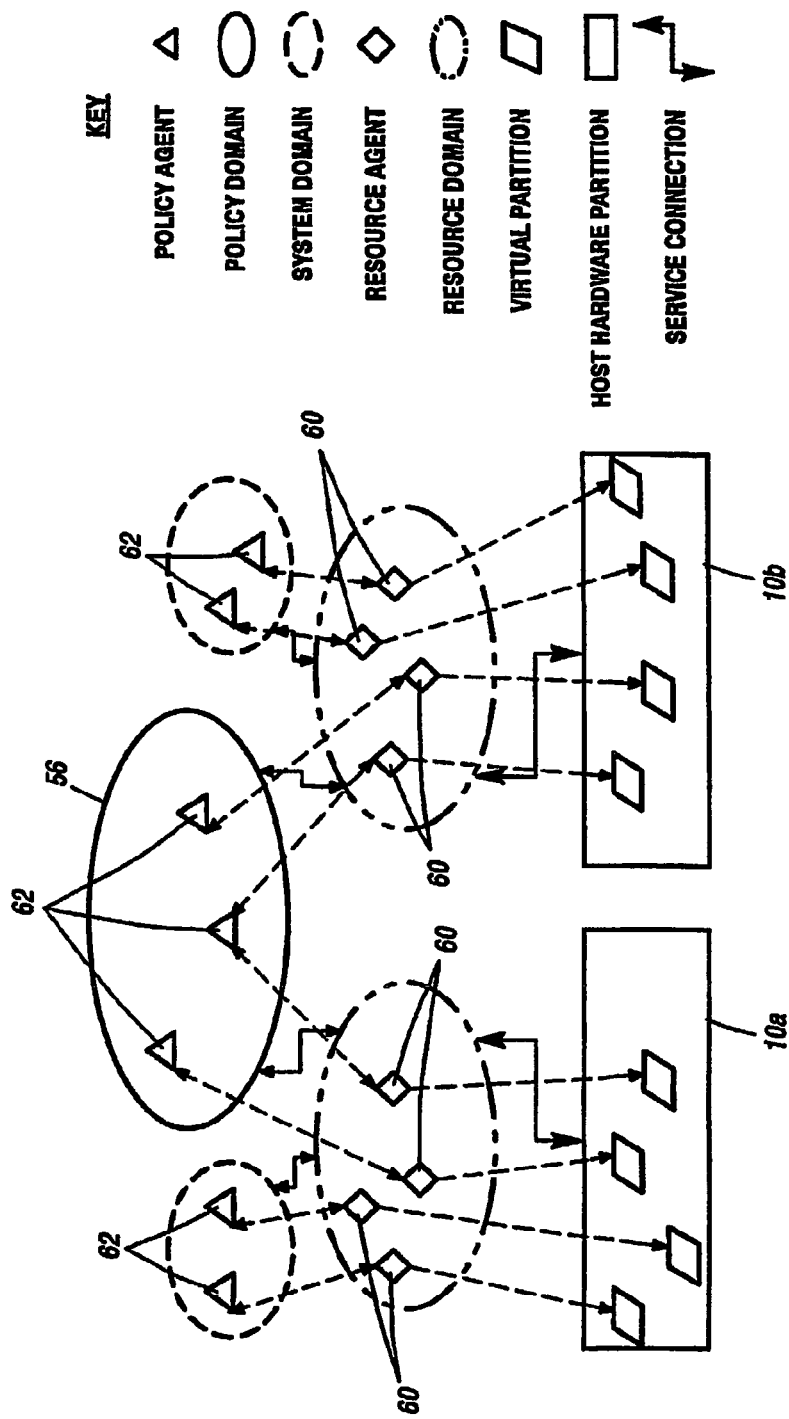
FIG. 12 illustrates a partition migration in progress.

Migration of active partitions between hosts is managed by the policy agent 62 coordinating a network communication path between the current and replacement resource agents. FIG. 12 shows a partition migration in progress. While the current partition is still running, a new partition is prepared and waits in standby state, until the final changes to memory pages have been transferred.

In FIG. 12, The operations (policy) service 56 in the operations partition 22 connects to the TCP socket where the resource service in the command partition 20 is listening. Both the operations partition 22 and command partition 20 connect through a network channel to some network zone. When both partitions happen to be in the same host 10, no physical network is actually involved in the communication. On the other hand, the command partition 20 always runs in the same host 10 as the ultravisor partition 14 and connects using the special command channel 38.

In FIG. 12, the item at the top left is monitoring the command and I/O partition of the left host 10*a*. The item at the top right is monitoring the command and I/O partition of the right host 10*b*. The item at the top center of FIG. 12 shows an operations service 56 on an arbitrary host that is operating three partitions. One is active on the left host 10*a* and one is active on the right host 10*b*. The third is currently active on the left host 10*a* but a partition migration to the right host 10*b* is in progress.

In FIG. 12, the operations partition 22 has already identified the migration target host. The operations service 56 has contacted the resource service at the target and created a partition with the necessary memory resources, and reserved processor resources. The operations service 56 has introduced the resource services of the source and target to each other by providing the TCP address of the migration service of the target to the source. The migration service of the client transfers memory contents to the target and monitors changes to the memory that occur after transfer has started. Once minimal modified pages remain, the source partition is paused and remaining modified pages are transferred. Channels are connected at the target to appropriate zones, and partition is resumed at the target by scheduling reserved processor resources.

The workload management architecture of the ultravisor software simplifies resource management while achieving higher utilization levels of the host hardware partitions. The ultravisor architecture also provides a mechanism for mapping to 3D-VE models and may also provide a single mechanism for integration with operations of Microsoft's Virtual Server and VMWare's ESX virtual partitions. Also, since resource allocation does not solely depend on ACPI descriptions and operating system implementations, additional opportunities for platform hardware innovation are available.

For 3D-VE integration, the ultravisor software must provide mechanisms to apply business policy to resource allocation for the virtual partitions. Interfaces are preferably provided that allow policy to be captured and managed at the business level. The ultravisor architecture preferably accommodates this integration by, for example, assuming that each virtual partition or virtual cluster supports a single workload. Workload objects in the infrastructure may allow modeling the consolidation of workloads to virtual partitions. Non-ultravisor components within the virtual partitions manage and track resource allocation within the virtual partitions. By allocating resources based on business policy, lower priority less immediate needs can utilize resources that would otherwise go unused (e.g. the virtual hardware for low priority applications is nearly 'free', though naturally it still requires power and cooling).

Figure 13:
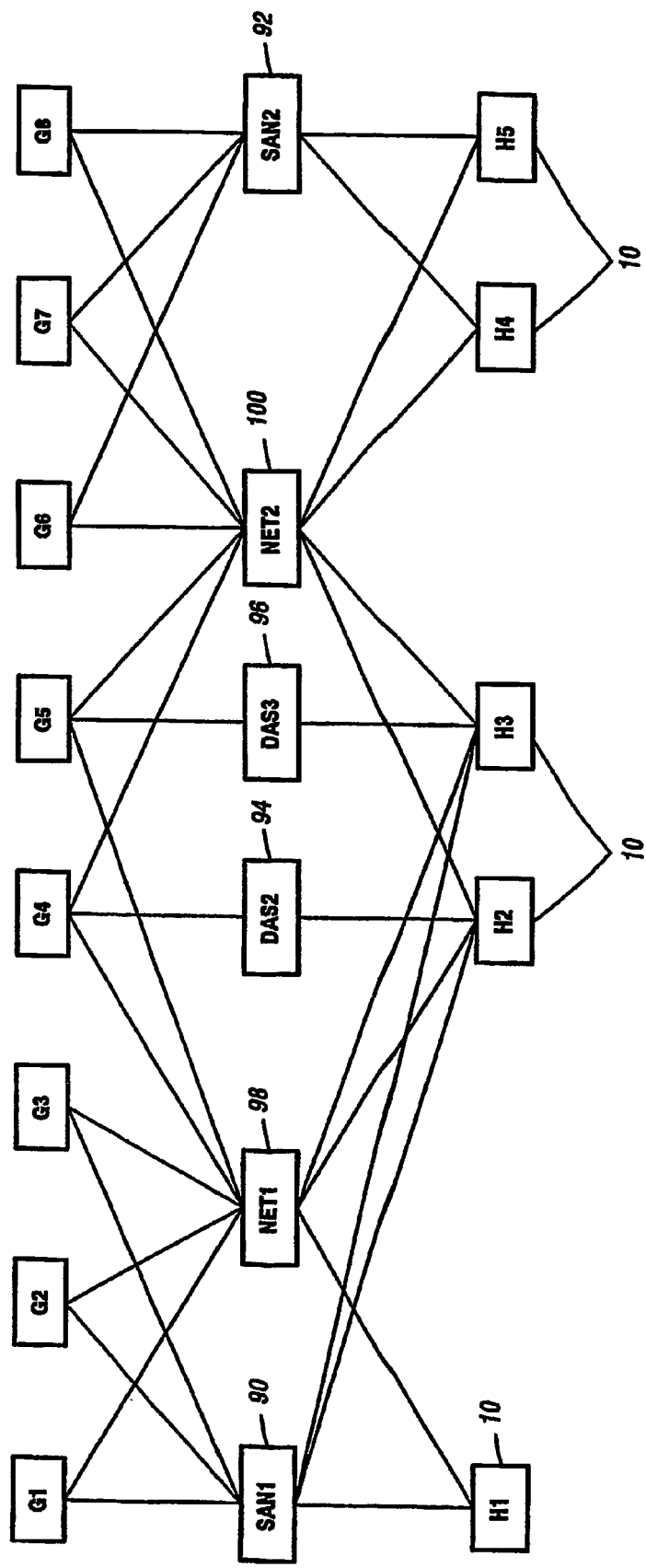
FIG. 13 illustrates the assignment of hardware resources of multiple hosts to zones for management by operations partitions in a data center configuration.

In FIG. 13, G1-G8 represent guest partitions; SAN1 90, SAN2 92 represent Storage Area Networks; DAS2, DAS3 94, 96 represent Direct Attached Storage of the respective hosts; NET1, NET2 98, 100 represent Ethernet networks; and H1-H5 represent host partitions 10. Host H1 has HBA connected to SAN1 and NIC connected to NET1. H4 and H5 have HBA connected to SAN2 and NIC connected to NET2. H2 is connected like H1 but has additional NIC connected to NET2 and has direct attached storage volumes available for guest partition use. H3 is similar to H2, except naturally the DAS is distinct.

G1, G2, G3 require storage volumes on SAN1, and communications on NET1. G6, G7, G8 require storage volumes on SAN2 and communications on NET2. G4 and G5 might be mutually redundant virtual firewall applications that interconnect NET1 and NET2. They have storage volumes respectively on DAS2 and DAS3 which constrains each of them to a single host. (These storage volumes could be migrated to SAN1.)

As illustrated in FIG. 13, G1, G2, G3 can run on either H1 or H2, and G6, G7, G8 can run on either H4 or H5. (Attributes of the hosts associated with the zones identify whether the SAN and NET connections have redundant paths. Presumably the SAN and NET infrastructure also have redundant components.)

The physical manifestation of some zone types is simply an Ultravisor software component, e.g. {Firmware, Monitor}. These zones allow host partitions to identify which firmware and monitor implementations are available, and guest partitions to identify component requirements or preferences. Some zone types have no physical manifestation: e.g. {Power, Processor, Memory}. These can be used to describe arbitrarily abstract available and desired capabilities of the host and guest partitions. Power zones allow guest partitions to specify specific host power sources. Processor and Memory zones allow data centers with a collection of non uniform hosts to abstractly describe the processor and memory performance characteristics. This allows guests with the highest processor demands to be associated with the fastest host processors, and guests with greatest memory throughput demands to be associated with the hosts with fastest memory subsystems.

A simplified zone matching function that ignores cardinality parameters is presented below. (This is sufficient to automatically choose H1/H2 for G1-G3 and H4/H5 for G5-G8 in FIG. 13.) This function can be elaborated with simple rules that identify optional zones, and allow ranking of zone preferences. The operations service evaluates this function for available hosts to select a host that can provide all of the required zones.

Virtual Data Center

In an exemplary implementation of the system of FIGS. 1 and 2, the ultravisor application and hypervisor system call interface software is loaded on a host system 10 to manage multiple operating systems running in logical or virtual partitions of an ES7000 host system. Several such host systems 10 may be interconnected as virtual data centers through expansion of the ultravisor management capability across nodes. The goal of the ultravisor system as described herein is to provide a flexible repartitioning of the available hardware resources into many isolated virtual systems. As so configured, the ultravisor system of the invention operates virtual partitions on each host hardware partition in a way that is as natural and intuitive as operation of physical servers. Such virtual data centers in accordance with the invention allow innovation within the large system complex and allows mega servers to interact with other data center components via standard data center interfaces and protocols. The virtual data center thus allows resource utilization to be maximized and allows mega servers constructed from 'commodity' processors and memory to be cost competitive with commodity servers and blade servers.

The ultravisor software provides automatic resource allocation of virtual partitions among multiple host hardware partitions. By capturing rudimentary resource usage metrics, a working set of virtual partitions can be assigned to each of the available host hardware partitions. Although an optimal allocation is complex, a good enough allocation can be accomplished through application of basic memory, processor, and input output (I/O) usage histories.

Application consolidation can also accomplished via consolidation of virtual servers into a virtual data center. This allows consolidation within partitions to focus on security and fault isolation boundaries. At the scale of a virtual data center, virtual partitions (or virtual servers) are every bit as natural as rack mounted or blade packaged servers. To provide a natural operation, the virtual data center design is based on the behavior of physical computer systems or physical blades in a data center rack. This requires key abstractions in the virtual data center design. For example, consider several racks somewhere in a spacious network closet. A 'storage' rack contains a JBOD array, a storage switch and associated components for SAN storage. A 'network' rack contains various Ethernet switches for interconnection with the enterprise network. A 'server' rack contains one or more cells of a large scale enterprise system. At least some of these cells contain I/O hardware that interconnects to the SAN and communication networks. The contents of these racks make up the virtual data center.

The virtual data center has a number of collections of (virtual) partitions interconnected with each other by virtual NICs and with storage by virtual HBAs. New (virtual) partitions can be readily created by cloning partition templates. The units in the server racks have HBAs and NICs and connect to switches in the storage and network racks.

Application deployment is a two step process, the first of which can be shared by multiple applications. The first step is defining the data center infrastructure (in this case to the ultravisor). This primarily involves identifying the communications and storage networks that are connected to the enterprise server. Multiple network zones may be connected to the server, or a backbone may be the physical interconnection, which provides virtual network zones via IPSEC and VPN technologies. Application deployment then involves mapping to components deployed via the ultravisor partition 14. The key components are the virtual partitions, the virtual HBA, and virtual NIC instances they contain. Each virtual NIC instance maps to a predefined virtual network zone. In a typical installation, each virtual HBA maps to a SAN 'fabric' (zone) provided via SAN technologies.

FIG. 4 illustrates a simple single host view of a data center. In this embodiment, the monitor instances shown at the bottom edges of the partitions have read only access to their partition descriptor 58 in the ultravisor partition 14. The (policy) operations service 56 in the operations partition 22 and the resource service 52 in the command partition 20 communicate via authenticated and secured 'web service' interfaces over an Ethernet interconnect 54. This allows a small number of operations partitions 22 to manage a large number of hosts 10 through the associated command partition 20 resource services. The operations service 56 validates that the operations and command partitions 20 connect to the same network zone.

Figures 14, 14A:
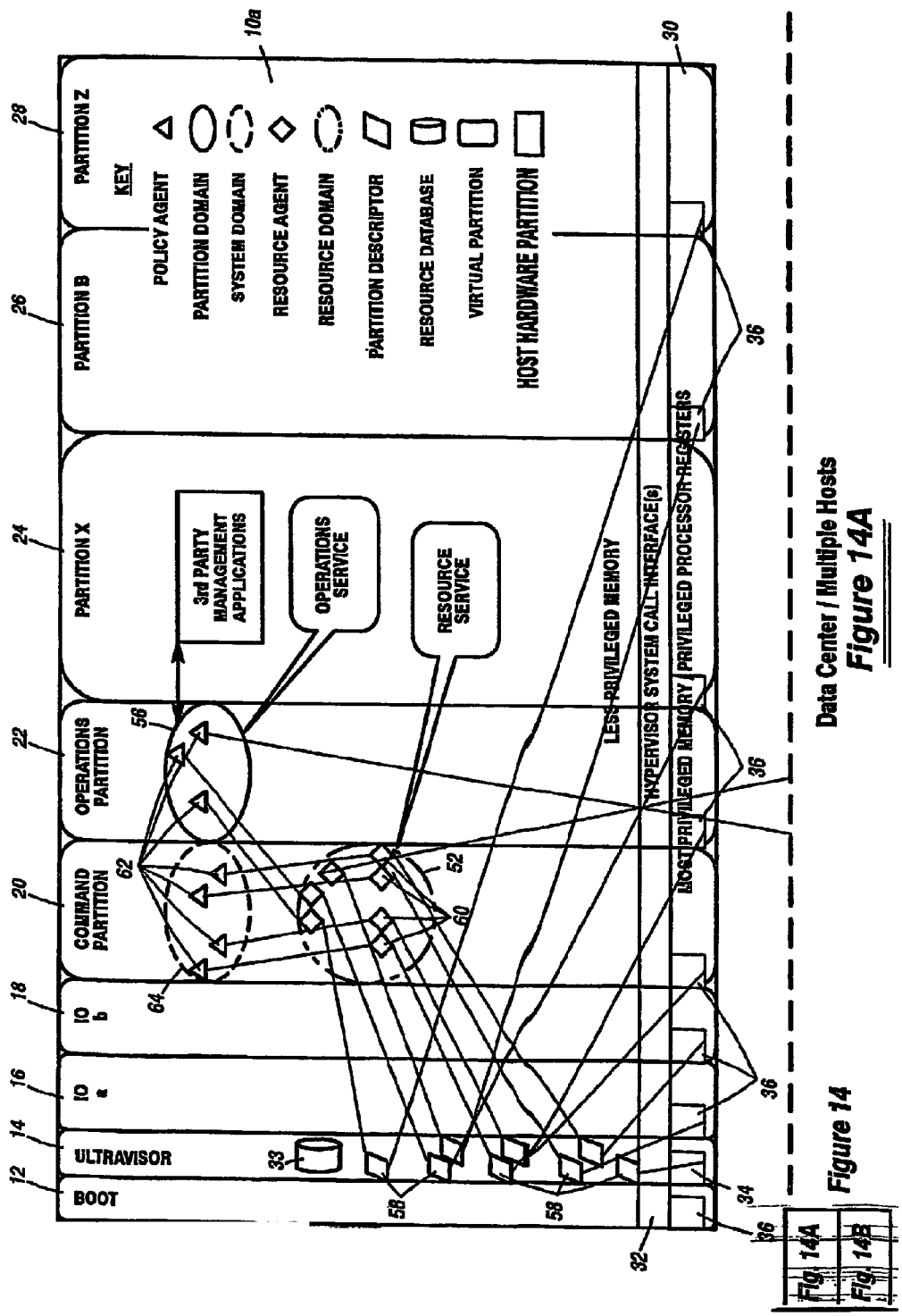
FIG. 14 illustrates a multiple host data center implemented in accordance with the invention whereby the distributed operations service running in the operations partitions chooses appropriate host hardware partitions on the same or a different host.
Figure 14B:
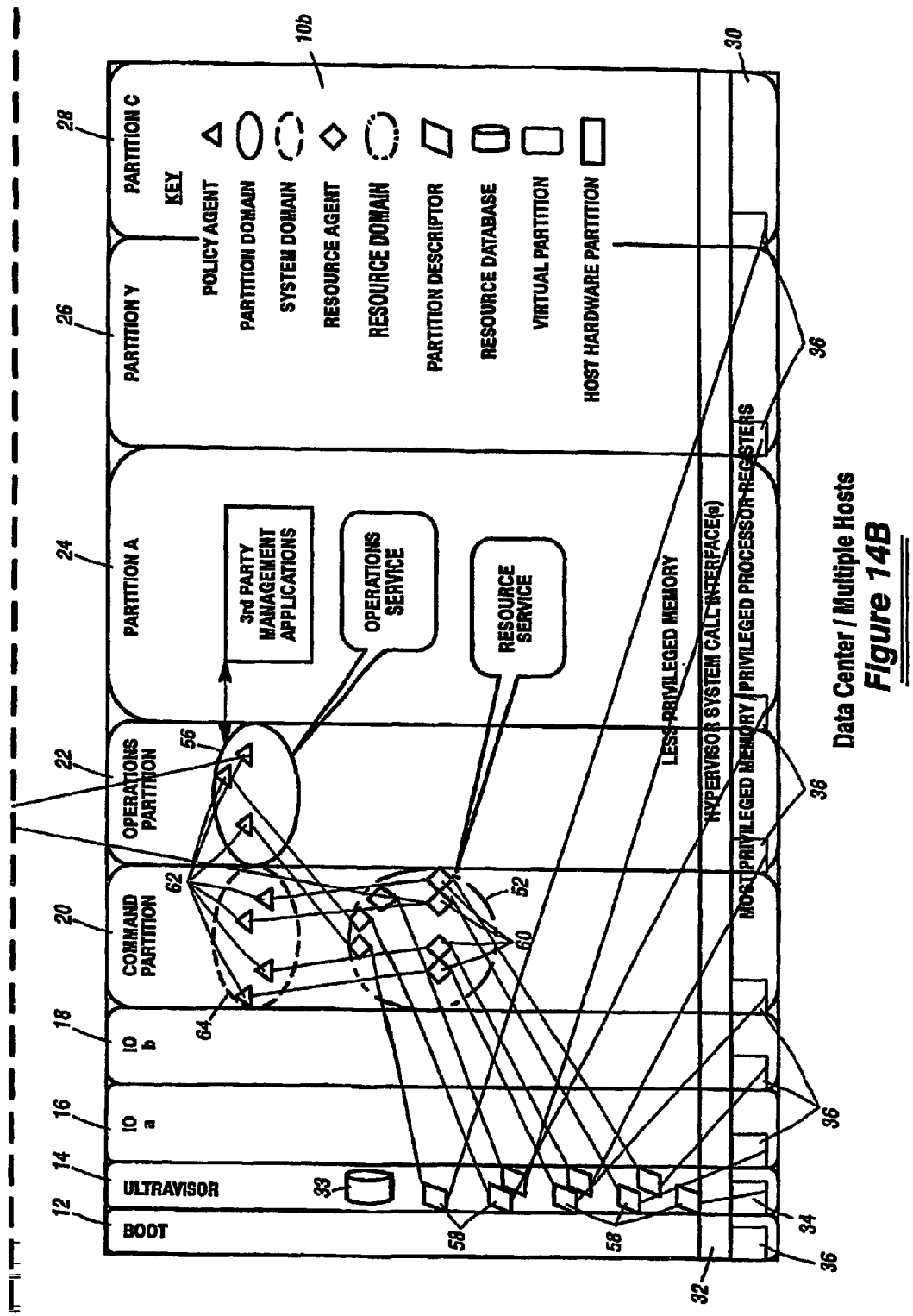

FIG. 14 illustrates a multiple host data center implemented in accordance with the invention. In this configuration, the distributed operations service running in the operations partitions 22 chooses appropriate host hardware partitions. The distributed service can failover and can do load balancing. In FIG. 14, the operations service in the upper host is operating X, Y, Z and has hosted Y on the lower host. The operations service in the lower host is operating A, B, C and has hosted B on the upper host.

The operations service matches guests to hosts through their associated resource zones. For example, the Ethernet network is divided into zones, and each zone is identified via an object in the ultravisor operations model. The host 10 are associated with the zones to which the I/O adaptors are physically connected. The guest partitions 24, 26, 28 are associated with the zones to which the partitions require access. The operations service 56 matches guest partitions to hosts with the available zones.

Zones are not limited to communications networks. There are different zone types, including: Network, Storage, Console, Firmware, Monitor, Power, Processor, and Memory. A 'Direct Attached Storage' (DAS) zone is by definition associated with a single host 10. Guest partitions 24, 26, 28 that reference this type of storage zone are constrained to the host 10 that contains the attached disks and have access to the storage volumes directly connected to the host 10. A 'Storage Area Network' (SAN) zone is associated with all of the hosts 10 connected to the identified fiber-channel, Infiniband, or iSCSI storage network. Guest partitions 24, 26, 28 that reference this type of zone can be hosted by any of the hosts 10 with a connection to the zone.

The physical manifestation of some zone types is simply an ultravisor software component, e.g. {Firmware, Monitor}. These zones allow hosts 10 to identify which firmware and monitor implementations are available, and guest partitions 24, 26, 28 to identify component requirements or preferences. Some zone types have no physical manifestation: e.g. {Power, Processor, Memory}. These can be used to describe arbitrarily abstract available and desired capabilities of the host 10 and guest partitions 24, 26, 28. Power zones allow guest partitions to specify specific host power sources. Processor and Memory zones allow data centers with a collection of non-uniform hosts to abstractly describe the processor and memory performance characteristics. This allows guests with the highest processor demands to be associated with the fasted host processors, and guests with greatest memory throughput demands to be associated with the hosts with fastest memory subsystems.

A simplified zone matching function that ignores cardinality parameters is presented below. This can be elaborated with simple rules that identify optional zones, and allow ranking of zone preferences. The operations service evaluates this function for available hosts to select a host that can provide all of the required zones.

---

```
Private Function ChannelZonesAvailable_
  (ByVal guest As IPartitionDefinition, ByVal host As
  IPartitionDefinition)_
  As Boolean
  Dim c As Integer
```

-continued

```
Dim z As Integer
Dim GuestChannel As IPartitionChannel
Dim HostChannel As IPartitionChannel
Dim ZoneFound As Boolean
For c = 1 To guest.ChannelCount
    GuestChannel = guest.Channel(c - 1)
    ZoneFound = False
    For z = 1 To host.ChannelCount
       HostChannel = host.Channel(z - 1)
       If GuestChannel.TypeId.CompareTo(HostChannel.TypeId) =
       0 Then
          If GuestChannel.ZoneId.CompareTo(HostChannel.ZoneId) =
          0 Then
             ZoneFound = True
             Exit For
          End If
       End If
    Next z
    If Not ZoneFound Then
       Return False
    End If
Next c
Return True
End Function
```

Virtual Networks

Rather than require network hardware emulation down to the level of plugging network cables from each virtual NIC to a virtual switch, network zones are one of the primary objects in the ultravisor operations model. Administrators may associate partitions directly with one or more network zones rather than indirectly via virtual cable connections. One or more standard data center patterns are provided with the ultravisor. One typical example is: DMZ (demilitarized zone), Application Zone, Data Zone, Intranet Zone, and Data Center Backbone. The network zones connect the components of the virtual data center (described above) with other components in other virtual data center boxes or with components in the physical data center itself.

The virtual network infrastructure honors policy mechanisms that allow resources to be targeted where desired. Policy mechanisms need to include typical Quality of Service (QOS) and bandwidth guarantees and/or limits including, for example, min/max send/receive requests per second and min/max send/receive bytes per second.

Firewalls are the primary mechanism used to join different networks. Networks can be completely encapsulated within an ultravisor host hardware partition, can directly connect to physical networks, and can be interconnected via IPSEC and/or IPSEC and SSL VPN connections.

Each physical NIC in an ultravisor host system 10 is associated with a network zone. Each of the virtual partitions configured for connection to the network zone is connected directly by a virtual switch. In the ultravisor object model, a SAN is just a different type of network. For example, iSCSI traffic can be segregated by defining a separate network zone for storage. A fiber channel (SAN) is always described by a separate storage network zone. Directly Attached Storage (DAS) is a special type of storage network limited to the attached host 10. ATA allows one attached partition; parallel SCSI allows one or two attached hosts 10.

By way of example, if data center is implemented with two 540 G2 systems and two 540 G3 systems that are partitioned 16 times with means to support 8 hosts. The G3 systems have faster processors. Using virtualized networks, one may create a G3 processor zone and reference it from the G3 host partitions and create a G2 processor zone and reference it from the G2 host partitions. Then a guest partition (presumably with a processor intensive workload) can reference the G3 processor zone to run on a faster host 10. A guest partition 24, 26, 28 that references the G2 processor zone will run on a slower host. A guest partition 24, 26, 28 that references neither can (and will) run on either. The way a guest partition 24, 26, 28 would reference the G3 processor zone would be to edit the partition definition and add a channel of type 'processor zone', and select 'G3' from the list of available zones. By reusing the zone concept in connection with virtual networks, the user interfaces do not need special devices to allow host/guest partitions to be categorized into sets of power/memory/processor groupings.

Virtual Clusters

Clusters also define individual host hardware partitions. The nodes of the cluster instance define the pattern of infrastructure guest partitions that run in the host 10. To manage availability, the ultravisor application must be aware of how partitions are mapped as cluster nodes. Partitions that are cluster nodes are prime candidates for moving to other hosts 10 and for dynamically controlling the number of active node instances to match the demand. The number of configured node instances, with their corresponding disk volume images, can also be dynamically created and destroyed automatically if a partition template is associated with the cluster. The resource management application must prevent cluster outages by coordinating operations for the nodes of a virtual cluster. Even a simple cluster of two nodes within a single hardware host 10 is useful since it can provide uninterrupted cluster service while allowing dynamically changing software partition configurations (add/remove memory/processors), without requiring dynamic partitioning capabilities in the operating systems of the individual nodes. Windows clusters are comprised of various types: MSCS (availability or fault tolerant clusters), NLB (network load balancing clusters), DFS (distributed file system), and HPC (high performance clusters).

A load balancing cluster within a virtual data center allows scale up hardware to provide cost effective deployment of scale out technologies. Unneeded cluster nodes can be automatically transitioned to low power states and processor and memory power applied to lower priority tasks.

Virtual Servers

In the enterprise server context, where hardware partitions are common, 'virtual partition' is a natural term for virtual servers. Virtual servers in a virtual data center have a similar life cycle to physical servers in a physical data center. To provide an effective data center operations model, the virtual partitions must have persistent definitions and configurations.

Even though the virtual partitions exist only within an ultravisor hardware partition, the partition definitions are persisted even when inactive to provide a more compelling operations model of actual server hardware. This also facilitates automatically selecting an appropriate hardware partition (host) 10 with available resources to host the various virtual partitions. From the administrator/operator client consoles, the virtual partitions are nearly indistinguishable from hardware servers except that, unlike physical systems, 'hardware' changes can be accomplished remotely.

A partition does not cease to exist when it or its current hardware host 10 is stopped for any reason. This is just like a physical server which does not cease to exist when its power cord is unplugged. Also, a partition can have more than one configuration. The configuration of an active partition can be changed only if the OS supports dynamic partitioning. However, the next configuration can be selected and will become the active configuration when the partition is restarted.

Each partition definition must explicitly support multiple partition configurations. Otherwise administrators/operators will attempt to create alternate partition definitions for special purposes that share an existing partition's disk storage resources. This would complicate the 'hardware' operations model and add perceived complexity to the user interface. Making the alternate configurations explicit prevents this, for the ultravisor application allows only one configuration of a partition to be active. This strengthens both the persistence model, and the virtual data center operations model. Examples of when alternate configurations may be used include seasonal or weekly resource cycles and for partitions that are cluster nodes and can run with constrained resources to perform rolling upgrades and other maintenance operations.

The configurations of a partition are mapped, at least conceptually, to Windows hardware profiles. For example, Windows may reuse the 'portable computer' Dock ID' and 'Serial Number' mechanism provided by ACPI. A primary advantage of this integration is a more compelling operations model, since normal operating system mechanisms can be used to interact with the virtual hardware as:

"Use this device (enable)"
"Do not use this device (disable)"
"Do not use this device in the current hardware profile (disable)"
"Do not use this device in any hardware profile (disable)"

Having the ultravisor application aware of the 'hardware' profile also allows the platform to perform resource optimizations by not instantiating unused 'hardware'. The ultravisor operations framework and user interface provide mechanisms to synchronize the partition profile with the Windows hardware profile.

Virtual partitions in accordance with the invention preferably have a life cycle to facilitate their use as described herein. In particular, each partition is in one of seven life cycle stages at any point in time, including:

Construction
Provisioning (Automatic)
Operating (Automatic)
Manual
Disabled
Decommissioned
Template A partition is created in the construction stage. It starts the construction stage with simply a name and a globally unique identifier. It remains in this stage until the partition definition includes at least one partition configuration. The partition definition includes the location of the partition system volume. This contains the non-volatile RAM (NVAM) settings (a.k.a BIOS CMOS) for the partition.

Once initial construction is completed, the partition enters the provisioning stage. During this stage the partition is activated and can be automatically provisioned via network provisioning tools like ADS (Automated Deployment System). Alternatively, it can be provisioned manually (started and stopped) using a console to access the virtual partition firmware and mounting remote floppy or CDROM media.

Once provisioning is completed, the partition enters the operating stage. It remains in this stage for most of its lifetime. The ultravisor operations framework provides mechanisms that ensure the partition is operating based on the assigned business policy. In the simplest case, the operations partition 22 monitors assigned host systems 10. If any should fail, the operations partition 22 attempts to restart the failed host system 10. If restart fails, the operations partition selects replacement hosts for each of the hosted partitions.

Partition policy may include schedules (like run once a month, once a quarter, . . . ) that evaluate to partition state: running, paused, stopped {e.g. start on Friday afternoon, stop Monday morning}. Schedules also evaluate the selected configuration (e.g. restart partition with Weekend configuration on Saturday morning and restart again Monday morning with Weekday configuration). Schedules also evaluate assigned but unneeded resources (memory, processors), and excess processors and memory can be borrowed and returned when needed. Agents may use historical data to compute current resource requirements within a recommended policy range.

Partitions may be occasionally migrated to different hosts or data centers, and if the partition is a node in a defined cluster, the actions are coordinated with those of other nodes to maximize availability of the cluster.

Partitions also can be explicitly disabled. This is analogous to unplugging the virtual power cord. They remain inactive in this stage until moved back to the Operating stage, or until permanently deactivated by moving to the decommissioned stage. Decommissioned partitions may remain available for reference, be archived, or be permanently destroyed.

A partition in the template stage is used as a functional prototype to clone new partitions. Partitions can move directly from construction to the template stage. A partition template never has processors or memory assigned, but may have target storage volumes (or volume images) assigned to be cloned when the partition template is cloned. To create such a template, one may move a stopped partition from the provisioning stage Oust after running SysPrep) to the template stage.

The partition states are in three basic categories: uninstalled, inactive, and active. The uninstalled category corresponds to the construction phase of the life cycle. The inactive {Stopped, Saved (Hibernate)} and active {Starting, Running, Paused (Standby)} categories correspond to the Provisioning and Operating stages. Partitions in these stages that are currently assigned hardware memory and/or processor resources are active. Partitions in the operating stage may have associated schedules that automatically transition the partitions between the inactive and active states. A fourth (disabled) category corresponds to the disabled, decommissioned, and template stages.

Those skilled in the art also will readily appreciate that many additional modifications are possible in the exemplary embodiment without materially departing from the novel teachings and advantages of the invention. For example, those skilled in the art will appreciate that the in-memory resource database of the ultravisor partition may be partitioned to provide highest availability. FIG. 15 illustrates the host resources partitioned into two resource databases. The 'ultravisor a' partition 14a and 'ultravisor b' partition 14b each track resources for one half of the host system 10. Each has a corresponding command partition 20a, 20b to make the actual resource decisions. A common operations partition 22 makes the operational decisions. Another host partition in the virtual data center may provide a redundant operations partition. Each processor is exclusively assigned to one of the ultravisor partitions and there is limited or no interactions between the ultravisor partitions 14a, 14b.

Accordingly, any such modifications are intended to be included within the scope of this invention as defined by the following exemplary claims.

What is claimed:

1. A virtual data center implemented on hardware resources of at least one host computer having at least one host processor and system resources including memory divided into most privileged system memory and less privileged user memory, the virtual data center comprising:

- virtualization software loaded on each host computer, said virtualization software operating in said less privileged user memory and dividing the host computer into a plurality of virtual partitions including at least one user guest partition and at least one system partition, said at least one user guest partition providing a virtualization environment for at least one guest operating system, and said at least one system partition maintaining a resource database for use in managing use of said at least one host processor and said system resources;
- at least one monitor that operates in said most privileged system memory and maintains guest applications in said at least one guest partition within memory space allocated by said at least one system partition to said at least one guest partition;
- a context switch between said at least one monitor and said respective guest and system partitions for controlling multitask processing of software in said partitions on said at least one host processor; and
- a software application that owns a configuration policy for said data center and tracks persistence for respective domains to which each partition of said at least one host computer is assigned by said at least one system partition;
- wherein said at least one system partition comprises an ultravisor partition that includes said resource database and a resource management software application that assigns system resources to respective system and guest partitions and provides an index to the assigned system resource in said resource database, a command partition that owns a resource allocation policy for the host system on which it is loaded and that creates transactions that pass through a command memory channel between said command partition and said ultravisor partition for processing by said resource management software for reallocation of said system resources as specified in said transaction;
- wherein upon activation of a partition, the software application selects a host computer of said at least one host computer having required resources for said activated partition, connects to a resource service running in a command partition of said host computer, and provides a definition of the activated partition and a start command to the resource service.

2. The virtual data center of claim 1, wherein the software application is implemented in a system partition of one of said at least one host computers and the software application exchanges resource transactions with said command partition.

3. The virtual data center of claim 2, wherein the software application maintains a persistent database of virtual partition definitions for at least one domain of said at least one host computer.

4. The virtual data center of claim 3, wherein the command partition stores a copy of the virtual partition definitions for said at least one domain for bootstrap purposes in the event of a partition failure or a hardware failure of a host computer.

5. The virtual data center of claim 1, wherein said command partition stores a copy of said resource database, uses said copy of said resource database to select appropriate resources for the activated partition, and creates a transaction to update said resource database via said command memory channel.

6. The virtual data center of claim 1, wherein said software application monitors operation of said at least one host computer and, upon detection of host computer failure, chooses a new host computer for virtual partitions assigned to a failed host computer.

7. The virtual data center of claim 1, wherein said software application assigns an interconnected set of system resources of said at least one host computer to a zone and respective partitions are assigned to the zones with the system resources required by the respective partitions, where a zone is a unit of resource allocation for system resources of said at least one host computer within a computer network.

8. The virtual data center of claim 7, wherein said software application assigns new partitions to a host computer that does not include said software application by sending, over a network connection, a resource transaction to a command partition of the host computer that does not include said software application.

9. The virtual data center of claim 8, wherein said software application enables migration of an active partition on a first host computer to a second host computer by transferring memory contents of the active partition from the first host computer to a target partition activated in the second host computer via said network connection.

10. The virtual data center of claim 1, wherein said configuration policy targets allocation of system resources to a zone based on at least one of quality of service guarantees, bandwidth guarantees, and physical location of respective host computers.

11. The virtual data center of claim 1, wherein said configuration policy is changeable by a user to permit changes in configuration of said system resources based on different system resource schedules at different times.

12. The virtual data center of claim 2, wherein a redundant software application is loaded in a system partition in a second host computer different from the host computer hosting said software application.

13. A method of implementing a virtual data center on hardware resources of at least one host computer having at least one host processor and system resources, comprising the steps of:

- dividing said at least one host computer into a plurality of virtual partitions including at least one user guest partition and at least one system partition, said at least one user guest partition providing a virtualization environment for at least one guest operating system, and said at least one system partition maintaining a resource database for use in managing use of said at least one host processor and said system resources;
- maintaining guest applications in said at least one guest partition within memory space allocated by said at least one system partition to said least one guest partition;
- providing a context switch between said respective guest and system partitions for controlling multitask processing of software in said partitions on said at least one host processor;
- assigning each partition to a domain of said at least one host processor in accordance with a configuration policy for said data center; and
- tracking persistence for respective domains to which each partition of said at least one host computer is assigned by said at least one system partition;
- wherein said at least one system partition comprises an ultravisor partition that includes said resource database and said resource management software application and a command partition that owns a resource allocation policy for said host system, further comprising the steps of creating transactions that pass through a command memory channel between said command partition and said ultravisor partition and said resource management software processing said transaction for reallocation of said system resources as specified in said transaction; wherein upon activation of a partition, performing the steps of selecting a host computer of said at least one host computer having required resources for said activated partition, connecting to a resource service running in a command partition of said host computer, and providing a definition of the activated partition and a start command.

14. The method of claim 13, wherein the steps of assigning system resources comprises the step of assigning each partition of said at least one host computer to a domain based on a configuration policy.

15. The method of claim 14, further comprising the step of maintaining a persistent database of virtual partition definitions for at least one domain of said at least one host computer.

16. The method of claim 15, further comprising the step of storing a copy of virtual partition definitions for said at least one domain for bootstrap purposes for initial startup and in the event of a partition failure or a hardware failure of a host computer.

17. The method of claim 13, further comprising the step of storing a copy of said resource database in said command partition, using said copy of said resource database to select appropriate resources for the activated partition, and creating a transaction to update said resource database via said command memory channel.

18. The method of claim 13, further comprising the steps of monitoring operation of said at least one host computer and, upon detection of host computer failure, choosing a new host computer for virtual partitions assigned to a failed host computer.

19. The method of claim 15, further comprising the steps of assigning an interconnected set of system resources of said at least one host computer to a zone and assigning respective partitions to the zones with the system resources required by the respective partitions, where a zone is a unit of resource allocation for system resources of said at least one host computer within a computer network.

20. The method of claim 19, wherein said partitions assigning step comprises the steps of assigning new partitions to a host computer by sending, over a network connection, a resource transaction to a command partition of the host computer that is to host the new partition.

21. The method of claim 20, further comprising the step of migrating an active partition on a first host computer to a second host computer by transferring memory contents of the active partition from the first host computer to a target partition activated in the second host computer via said network connection.

22. The method of claim 14, further comprising the step of changing said configuration policy based on different system resource schedules at different times.

23. The method of claim 13, further comprising the step of separating resource management functionality into management by applications in at least three separate partitions, an operations partition that maintains resource allocation policy, a command partition that generates transactions requesting resources in accordance with the resource allocation policy, and a resource management partition that processes the transactions and updates the resource database based on said transaction processing.

\* \* \* \* \*